United States Patent
Gaal et al.

(10) Patent No.: US 12,446,041 B2
(45) Date of Patent: *Oct. 14, 2025

(54) DETERMINING TRANSMISSION PREPARATION TIME FOR WIRELESS COMMUNICATION ON AT LEAST ONE CARRIER

(71) Applicant: QUALCOMM Incorporated, San Diego, CA (US)

(72) Inventors: Peter Gaal, San Diego, CA (US); Yiqing Cao, Beijing (CN); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

This patent is subject to a terminal disclaimer.

(21) Appl. No.: 17/919,732

(22) PCT Filed: May 1, 2020

(86) PCT No.: PCT/CN2020/088544
§ 371 (c)(1),
(2) Date: Oct. 18, 2022

(87) PCT Pub. No.: WO2021/217680
PCT Pub. Date: Nov. 4, 2021

(65) Prior Publication Data
US 2023/0171764 A1    Jun. 1, 2023

Related U.S. Application Data

(60) Provisional application No. 63/015,961, filed on Apr. 27, 2020.

(30) Foreign Application Priority Data

Apr. 27, 2020    (WO) ................ PCT/CN2020/087151

(51) Int. Cl.
*H04W 72/21*    (2023.01)
*H04W 72/0453*   (2023.01)
(Continued)

(52) U.S. Cl.
CPC ....... *H04W 72/21* (2023.01); *H04W 72/0453* (2013.01); *H04W 72/1268* (2013.01); *H04W 72/23* (2023.01)

(58) Field of Classification Search
CPC . H04W 72/21; H04W 72/23; H04W 72/0453; H04W 72/1268
See application file for complete search history.

(56) References Cited

U.S. PATENT DOCUMENTS 12,171,001 B2 *   12/2024   Gaal ..................... H04W 72/21
2019/0166608 A1    5/2019   Kumar et al.
(Continued)

FOREIGN PATENT DOCUMENTS

CN    110475358 A    11/2019
EP    3629619 A1     4/2020
(Continued)

OTHER PUBLICATIONS

QUALCOMM: "Draft Text Proposal to 38.214 Subclause 5.3 and 6.4 on UE Processing Time in the Case of CA", 3GPP Draft, 3GPP TSG-RAN WG1 Meeting AH 1801, R1-1803500, 38.214 TP on UE Processing Time With CA, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 16, 2018-Mar. 2, 2018, Mar. 5, 2018 (Mar. 5, 2018), XP051398797, 3 pages, section 5.3 section 6.4.
(Continued)

*Primary Examiner* — Jael M Ulysse
(74) *Attorney, Agent, or Firm* — Paul M. McAdams; Loza & Loza LLP

(57) ABSTRACT

A base station (BS) may determine (estimate) a preparation time for at least one uplink (UL) transmission by a user
(Continued)

equipment (UE) on at least one radio frequency (RF) carrier. The BS may determine the preparation time so that the BS will send a grant for the at least one transmission to the UE a sufficient amount of time (based on the estimated preparation time) before the at least one transmission is scheduled to occur to enable the UE to conduct the at least one UL transmission on a selected one of the RF carriers or on both RF carriers. The BS may select the longest preparation time from the preparation times of different RF carriers. The BS may select the subcarrier spacing (SCS) index from the SCS indexes for different RF carriers that provides a longer preparation time. The BS may add a defined value to a preparation time.

27 Claims, 15 Drawing Sheets

(51) Int. Cl.
*H04W 72/1268* (2023.01)
*H04W 72/23* (2023.01)

(56) References Cited

U.S. PATENT DOCUMENTS

| | | | |
|---|---|---|---|
| 2019/0223224 | A1 | 7/2019 | Park et al. |
| 2019/0289622 | A1* | 9/2019 | Chatterjee ............ H04W 72/20 |
| 2019/0297621 | A1 | 9/2019 | Li |
| 2020/0221508 | A1 | 7/2020 | Huang et al. |
| 2020/0359410 | A1 | 11/2020 | Li et al. |
| 2021/0243635 | A1 | 8/2021 | Yan et al. |
| 2021/0306916 | A1 | 9/2021 | Bae |
| 2021/0337576 | A1 | 10/2021 | Gaal |
| 2022/0022245 | A1 | 1/2022 | Dudda et al. |
| 2022/0045802 | A1* | 2/2022 | Park ..................... H04L 1/1861 |
| 2022/0225428 | A1 | 7/2022 | Xiong et al. |
| 2022/0417976 | A1* | 12/2022 | Park ..................... H04L 5/0053 |
| 2023/0188306 | A1* | 6/2023 | Nory ....................... H04L 5/001 370/330 |
| 2024/0137943 | A1* | 4/2024 | Dudda ................. H04L 5/0064 |

FOREIGN PATENT DOCUMENTS

| | | | |
|---|---|---|---|
| WO | 2019031937 | A1 | 2/2019 |
| WO | 2019213941 | A1 | 11/2019 |
| WO | 2019216703 | A1 | 11/2019 |
| WO | 2020032587 | A1 | 2/2020 |
| WO | 2020032588 | A1 | 2/2020 |

OTHER PUBLICATIONS

Qualcomm Incorporated: "Summary of [98-NR-05] Email Discussion on Timing Ambiguity", 3GPP TSG RAN WG1 Meeting #98bis, R1-1911088, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 22, 2019, 24 Pages, XP051798612, sections 1-3.

Qualcomm Incorporated: "Offline Summary for NR Timing Ambiguity", 3GPP TSG RAN WG1 Meeting #98bis, R1-1911529, 3rd Generation Partnership Project, Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 22, 2019, 15 Pages, XP051798793, sections 1-3.

Supplementary European Search Report—EP20933869—Search Authority—The Hague—Apr. 8, 2024.

Huawei, et al., "Discussion On the Remaining Issues of Supporting Tx Switching Between Two Uplink Carriers", 3GPP TSG RAN WG1 Meeting #100bis-e, R1-2002661, E-meeting Apr. 20, 2020-Apr. 30, 2020, Apr. 11, 2020, 17 Pages, Chapter 2-3, p. 14 Line 19-Line 24, p. 15 6th from last Row-16th Page line 1.

Moderator (China Telecom): "Summary#2 of Uplink TX Switching", 3GPP TSG RAN WG1 #100bis, R1-2002724, e-Meeting, Apr. 20-30, 2020, pp. 1-16.

Qualcomm Incorporated: "Summary of [98-NR-05] Email Discussion on Timing Ambiguity", 3GPP TSG RAN WG1 Meeting #98bis, R1-1911088, Chongqing, China, Oct. 14, 2019-Oct. 20, 2019, Oct. 22, 2019, 24 Pages, Chapter 2.

3GPP TS 38.213: "3rd Generation Partnership Project, Technical Specification Group Radio Access Network, NR, Physical Layer Procedures for Control (Release 16)", 3GPP TS 38.213, V16.1.0, Apr. 3, 2020, 3rd Generation Partnership Project, Mobile Competence Centre, 650, Route Des Lucioles, F-06921 Sophia-Antipolis Cedex, France, vol. RAN WG1. No. V16.1.0, Apr. 3, 2020, XP051893821, pp. 1-156, p. 17, line 3-p. 18, line 8, paragraph [0010], Section 9, clauses 6, 9.2.1, 10.2 and 12.

Huawei., et al., "Discussion on the Remaining Issues of Supporting Tx Switching between Two Uplink Carriers", 3GPP TSG RAN WG1 Meeting #100bis-e R1-2002661, E-meeting Apr. 20-Apr. 30, 2020, 17 Pages, Chapter 1-3, Appendix A1, Apr. 11, 2020 (Apr. 11, 2020) Sections 1, 2.

International Search Report and Written Opinion—PCT/CN2020/087151—ISA/EPO—Feb. 1, 2021.

International Search Report and Written Opinion—PCT/CN2020/088544—ISA/EPO—Jan. 27, 2021.

* cited by examiner

DETERMINING TRANSMISSION PREPARATION TIME FOR WIRELESS COMMUNICATION ON AT LEAST ONE CARRIER

CROSS-REFERENCE TO RELATED APPLICATION(S)

This application is the U.S. national stage of PCT patent application number PCT/CN2020/088544 filed on May 1, 2020, and claims priority to and the benefit of Patent Cooperation Treaty application number PCT/CN2020/087151, filed on Apr. 27, 2020, and U.S. provisional patent application No. 63/015,961, filed on Apr. 27, 2020, the entire content of each of which is incorporated herein by reference.

TECHNICAL FIELD

Aspects of the present disclosure generally relate to wireless communication, and specifically, to determining a preparation time for at least one transmission on at least one carrier of a multi-carrier communication system.

BACKGROUND

Wireless communication networks are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second BS. A BS may schedule access to a cell to support access by multiple UEs. For example, a BS may allocate different resources (e.g., time domain and frequency domain resources) for different UEs operating within a cell of the BS. As the demand for mobile broadband access continues to increase, research and development continue to advance communication technologies, including technologies for enhancing communication within a wireless network in particular, not only to meet the growing demand for mobile broadband access, but to advance and enhance the user experience with mobile communications.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One innovative aspect of the subject matter described in this disclosure can be implemented in a method for wireless communication. The method includes determining a first preparation time for a first radio frequency (RF) carrier and determining a second preparation time for a second RF carrier. In addition, a grant is transmitted for at least one uplink transmission to a user equipment (UE) based on a maximum preparation time, where the maximum preparation time is determined based on the first preparation time and the second preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in a wireless communication device (e.g., a base station). The wireless communication device includes a transceiver, a memory, and a processor communicatively coupled to the transceiver and the memory. The processor and the memory are configured to determine a first preparation time for a first radio frequency (RF) carrier and determine a second preparation time for a second RF carrier. The processor and the memory are also configured to transmit a grant for at least one uplink transmission to a user equipment (UE) based on a maximum preparation time, where the maximum preparation time is determined based on the first preparation time and the second preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in a wireless communication device (e.g., a base station). The wireless communication device includes means for determining a first preparation time for a first radio frequency (RF) carrier and a second preparation time for a second RF carrier, a means for determining a maximum preparation time, and a means for transmitting a grant. The means for determining a maximum preparation time determines a maximum preparation time based on the first preparation time and the second preparation time. The means for transmitting a grant transmits a grant for at least one uplink transmission to a user equipment (UE) based on the maximum preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in an article of manufacture for use by wireless communication device (e.g., a base station). The article of manufacture includes a computer-readable medium having stored therein instructions executable by one or more processors of the wireless communication device to determine a first preparation time for a first radio frequency (RF) carrier and determine a second preparation time for a second RF carrier. The computer-readable medium also has stored therein instructions executable by one or more processors of the wireless communication device to transmit a grant for at least one uplink transmission to a user equipment (UE) based on a maximum preparation time, where the maximum preparation time is determined based on the first preparation time and the second preparation time. The grant indicates resources for the at least one uplink transmission on the first RF carrier, on the second RF carrier, or on each of the first RF carrier and the second RF carrier.

In some implementations of the methods and wireless communication devices, the resources for the at least one uplink transmission commence at a first time and transmitting the grant for the at least one uplink transmission to the UE based on the maximum preparation time includes transmitting the grant to the UE at a second time that precedes the first time by at least the maximum preparation time. In some implementations of the methods and wireless communication devices, determining the maximum preparation time for the at least one uplink transmission based on the first preparation time and the second preparation time includes selecting the longest of the first preparation time or the second preparation time.

In some implementations of the methods and wireless communication devices, the grant is configured to trigger a switch by the UE between operating in a first uplink transmission mode and operating in a second uplink transmission mode. In some implementations, the methods and wireless communication devices may be configured to determine a third preparation time for a physical uplink shared channel (PUSCH), determine that the third preparation time is less than the maximum preparation time and, responsive to determining that the third preparation time is less than the maximum preparation time, generate the grant to not trigger a switch at the UE between a first uplink transmission mode and a second uplink transmission mode.

One innovative aspect of the subject matter described in this disclosure can be implemented in a method for wireless communication. The method includes determining at least one preparation time. The at least one preparation time may be a first preparation time for a first radio frequency (RF) carrier, a second preparation time for a second RF carrier, or the first preparation time for the first RF carrier and the second preparation time for the second RF carrier. In addition, a grant is transmitted for at least one uplink transmission to a user equipment (UE) based on an adjusted preparation time for at least one channel state information (CSI) transmission, where the adjusted preparation time is determined based on the at least one preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in a wireless communication device (e.g., a base station). The wireless communication device includes a transceiver, a memory, and a processor communicatively coupled to the transceiver and the memory. The processor and the memory are configured to determine at least one preparation time. The at least one preparation time may be a first preparation time for a first radio frequency (RF) carrier, a second preparation time for a second RF carrier, or the first preparation time for the first RF carrier and the second preparation time for the second RF carrier. The processor and the memory are also configured to transmit a grant for at least one uplink transmission to a user equipment (UE) based on an adjusted preparation time for at least one channel state information (CSI) transmission, where the adjusted preparation time is determined based on the at least one preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in a wireless communication device (e.g., a base station). The wireless communication device includes means for determining at least one preparation time, means for determining an adjusted preparation time, and means for transmitting a grant. The means for determining at least one preparation time determines a first preparation time for a first radio frequency (RF) carrier, a second preparation time for a second RF carrier, or the first preparation time for the first RF carrier and the second preparation time for the second RF carrier. The means for determining an adjusted preparation time determines an adjusted preparation time for at least one channel state information (CSI) transmission based on the at least one preparation time. The means for transmitting a grant transmits a grant for at least one uplink transmission to a user equipment (UE) based on the adjusted preparation time. The grant indicates resources for the at least one uplink transmission on the first RF carrier, on the second RF carrier, or on each of the first RF carrier and the second RF carrier.

Another innovative aspect of the subject matter described in this disclosure can be implemented in an article of manufacture for use by wireless communication device (e.g., a base station). The article of manufacture includes a computer-readable medium having stored therein instructions executable by one or more processors of the wireless communication device to determine at least one preparation time. The at least one preparation time may be a first preparation time for a first radio frequency (RF) carrier, a second preparation time for a second RF carrier, or the first preparation time for the first RF carrier and the second preparation time for the second RF carrier. The computer-readable medium also has stored therein instructions executable by one or more processors of the wireless communication device to transmit a grant for at least one uplink transmission to a user equipment (UE) based on an adjusted preparation time for at least one channel state information (CSI) transmission, where the adjusted preparation time is determined based on the at least one preparation time. The grant indicates resources for the at least one uplink transmission on the first RF carrier, on the second RF carrier, or on each of the first RF carrier and the second RF carrier.

In some implementations of the methods and wireless communication devices, determining the adjusted preparation time includes increasing an uplink preparation time by a defined value. In some implementations of the methods and wireless communication devices, determining the adjusted preparation time includes determining a maximum preparation time based on the first preparation time and the second preparation time. In some implementations of the methods and wireless communication devices, determining the maximum preparation time based on the first preparation time and the second preparation time may include selecting the longest of the first preparation time or the second preparation time. In some implementations of the methods and wireless communication devices, determining the maximum preparation time for the at least one uplink transmission based on the first preparation time and the second preparation time includes selecting the longest of the first preparation time or the second preparation time.

In some implementations of the methods and wireless communication devices, the resources for the at least one uplink transmission commence at a first time and transmitting the grant for the at least one uplink transmission to the UE based on the maximum preparation time includes transmitting the grant to the UE at a second time that precedes the first time by at least the maximum preparation time. In some implementations of the methods and wireless communication devices, the grant is configured to trigger a switch by the UE between operating in a first uplink transmission mode and operating in a second uplink transmission mode.

One innovative aspect of the subject matter described in this disclosure can be implemented in a method for wireless communication. The method includes determining a first subcarrier spacing (SCS) index for a first radio frequency (RF) carrier, a second SCS index for a second RF carrier, and a minimum SCS index based on the first SCS index and the second SCS index. In addition, a grant is transmitted for at least one uplink transmission to a user equipment (UE) based on a preparation time for at least one uplink transmission based on the minimum SCS index, where the preparation time is determined based on the minimum SCS index. The grant indicates resources for the at least one uplink transmission on the first RF carrier or on each of the first RF carrier and the second RF carrier.

Another innovative aspect of the subject matter described in this disclosure can be implemented in a wireless communication device (e.g., a base station). The wireless communication device includes a transceiver, a memory, and a processor communicatively coupled to the transceiver and the memory. The processor and the memory are configured to determine a first subcarrier spacing (SCS) index for a first radio frequency (RF) carrier, a second SCS index for a second RF carrier, and a minimum SCS index based on the first SCS index and the second SCS index. The processor and the memory are also configured to transmit a grant for at least one uplink transmission to a user equipment (UE) based on a preparation time for at least one uplink transmission based on the minimum SCS index, where the preparation time is determined based on the minimum SCS index. The grant indicates resources for the at least one uplink transmission on the first RF carrier or on each of the first RF carrier and the second RF carrier.

Another innovative aspect of the subject matter described in this disclosure can be implemented in a wireless communication device (e.g., a base station). The wireless communication device includes means for determining a subcarrier spacing (SCS), a means for determining a preparation time, and a means for transmitting a grant. The means for determining a preparation time determines a first subcarrier spacing (SCS) index for a first radio frequency (RF) carrier, a second SCS index for a second RF carrier, and a minimum SCS index based on the first SCS index and the second SCS index. The means for determining a preparation time determines a preparation time for at least one uplink transmission based on the minimum SCS index. The means for transmitting a grant transmits a grant for at least one uplink transmission to a user equipment (UE) based on the preparation time. The grant indicates resources for the at least one uplink transmission on the first RF carrier or on each of the first RF carrier and the second RF carrier.

Another innovative aspect of the subject matter described in this disclosure can be implemented in an article of manufacture for use by wireless communication device (e.g., a base station). The article of manufacture includes a computer-readable medium having stored therein instructions executable by one or more processors of the wireless communication device to determine a first subcarrier spacing (SCS) index for a first radio frequency (RF) carrier, a second SCS index for a second RF carrier, and a minimum SCS index based on the first SCS index and the second SCS index. The computer-readable medium also has stored therein instructions executable by one or more processors of the wireless communication device to transmit a grant for at least one uplink transmission to a user equipment (UE) based on a preparation time for at least one uplink transmission based on the minimum SCS index, where the preparation time is determined based on the minimum SCS index. The grant indicates resources for the at least one uplink transmission on the first RF carrier or on each of the first RF carrier and the second RF carrier.

In some implementations of the methods and wireless communication devices, determining the minimum SCS index based on the first SCS index and the second SCS index includes selecting the lowest of the first SCS index or the second SCS index. In some implementations of the methods and wireless communication devices, the resources for the at least one uplink transmission commence at a first time and transmitting the grant for the at least one uplink transmission to the UE based on the maximum preparation time includes transmitting the grant to the UE at a second time that precedes the first time by at least the maximum preparation time. In some implementations of the methods and wireless communication devices, the grant is configured to trigger a switch by the UE between operating in a first uplink transmission mode and operating in a second uplink transmission mode.

One innovative aspect of the subject matter described in this disclosure can be implemented in a method for wireless communication. The method includes determining a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. The method also includes configuring at least one component of the UE such that the UE processes a received uplink grant within the preparation time.

Another innovative aspect of the subject matter described in this disclosure can be implemented in a wireless communication device (e.g., a UE). The wireless communication device includes a transceiver, a memory, and a processor communicatively coupled to the transceiver and the memory. The processor and the memory are configured to determine a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. The processor and the memory are also configured to configure at least one component of the UE such that the UE processes a received uplink grant within the preparation time.

Another innovative aspect of the subject matter described in this disclosure can be implemented in a wireless communication device (e.g., a UE). The wireless communication device includes means for determining a preparation time and a means for configuring. The means for determining a preparation time determines a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. The means for configuring configures at least one component of the UE such that the UE processes a received uplink grant within the preparation time.

Another innovative aspect of the subject matter described in this disclosure can be implemented in an article of manufacture for use by wireless communication device (e.g., a UE). The article of manufacture includes a computer-readable medium having stored therein instructions executable by one or more processors of the wireless communication device to determine a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. The computer-readable medium also has stored therein instructions executable by one or more processors of the wireless communication device to configure at least one component of the UE such that the UE processes a received uplink grant within the preparation time.

In some implementations, the methods and wireless communication devices may be configured to switch from the first uplink transmission mode to the second uplink transmission mode. In some implementations, the methods and wireless communication devices may be configured to switch from the second uplink transmission mode to the first uplink transmission mode. In some implementation, the first preparation time is a preparation time for a physical uplink shared channel (PUSCH) transmission by the UE or a preparation time for a channel state information (CSI) transmission by the UE and the second preparation time is a preparation time for a PUSCH transmission by the UE or a preparation time for a CSI transmission by the UE.

In some implementations of the methods and wireless communication devices, configuring the at least one component includes setting a processing clock speed. In some implementations of the methods and wireless communication devices, configuring the at least one component includes setting a memory allocation. In some implementations of the methods and wireless communication devices, determining the preparation time includes determining a first preparation time for the first RF carrier, determining a second preparation time for the second RF carrier, and determining a largest preparation time of the first preparation time and the second preparation time.

One innovative aspect of the subject matter described in this disclosure can be implemented in a method for wireless communication. The method includes determining a first subcarrier spacing (SCS) index for a first radio frequency (RF) carrier, a second SCS index for a second RF carrier, and a minimum SCS index based on the first SCS index and the second SCS index. In addition, a grant is transmitted for at least one channel state information (CSI) transmission to a user equipment (UE) based on a preparation time for at least one CSI transmission based on the minimum SCS index, where the preparation time is determined based on the minimum SCS index. The grant indicates resources for the at least one CSI transmission on the first RF carrier or on each of the first RF carrier and the second RF carrier.

Another innovative aspect of the subject matter described in this disclosure can be implemented in a wireless communication device (e.g., a base station). The wireless communication device includes a transceiver, a memory, and a processor communicatively coupled to the transceiver and the memory. The processor and the memory are configured to determine a first subcarrier spacing (SCS) index for a first radio frequency (RF) carrier, a second SCS index for a second RF carrier, and a minimum SCS index based on the first SCS index and the second SCS index. The processor and the memory are also configured to transmit a grant for at least one channel state information (CSI) transmission to a user equipment (UE) based on a preparation time for at least one CSI transmission based on the minimum SCS index, where the preparation time is determined based on the minimum SCS index. The grant indicates resources for the at least one CSI transmission on the first RF carrier or on each of the first RF carrier and the second RF carrier.

Another innovative aspect of the subject matter described in this disclosure can be implemented in a wireless communication device (e.g., a base station). The wireless communication device includes means for determining a subcarrier spacing (SCS), a means for determining a preparation time, and a means for transmitting a grant. The means for determining a preparation time determines a first subcarrier spacing (SCS) index for a first radio frequency (RF) carrier, a second SCS index for a second RF carrier, and a minimum SCS index based on the first SCS index and the second SCS index. The means for determining a preparation time determines a preparation time for at least one channel state information (CSI) transmission based on the minimum SCS index. The means for transmitting a grant transmits a grant for at least one CSI transmission to a user equipment (UE) based on the preparation time. The grant indicates resources for the at least one CSI transmission on the first RF carrier or on each of the first RF carrier and the second RF carrier.

Another innovative aspect of the subject matter described in this disclosure can be implemented in an article of manufacture for use by wireless communication device (e.g., a base station). The article of manufacture includes a computer-readable medium having stored therein instructions executable by one or more processors of the wireless communication device to determine a first subcarrier spacing (SCS) index for a first radio frequency (RF) carrier, a second SCS index for a second RF carrier, and a minimum SCS index based on the first SCS index and the second SCS index. The computer-readable medium also has stored therein instructions executable by one or more processors of the wireless communication device to transmit a grant for at least one channel state information (CSI) transmission to a user equipment (UE) based on a preparation time for at least one CSI transmission based on the minimum SCS index, where the preparation time is determined based on the minimum SCS index. The grant indicates resources for the at least one CSI transmission on the first RF carrier or on each of the first RF carrier and the second RF carrier.

In some implementations of the methods and wireless communication devices, transmitting the grant includes transmitting the grant on the first RF carrier. In some implementations of the methods and wireless communication devices, the grant schedules the at least one CSI transmission on the second RF carrier.

In some implementations of the methods and wireless communication devices, determining the minimum SCS index based on the first SCS index and the second SCS index includes selecting the lowest of the first SCS index or the second SCS index. In some implementations of the methods and wireless communication devices, the resources for the at least one CSI transmission commence at a first time and transmitting the grant for the at least one CSI transmission to the UE based on the maximum preparation time includes transmitting the grant to the UE at a second time that precedes the first time by at least the maximum preparation time. In some implementations of the methods and wireless communication devices, the grant is configured to trigger a switch by the UE between operating in a first CSI transmission mode and operating in a second CSI transmission mode.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
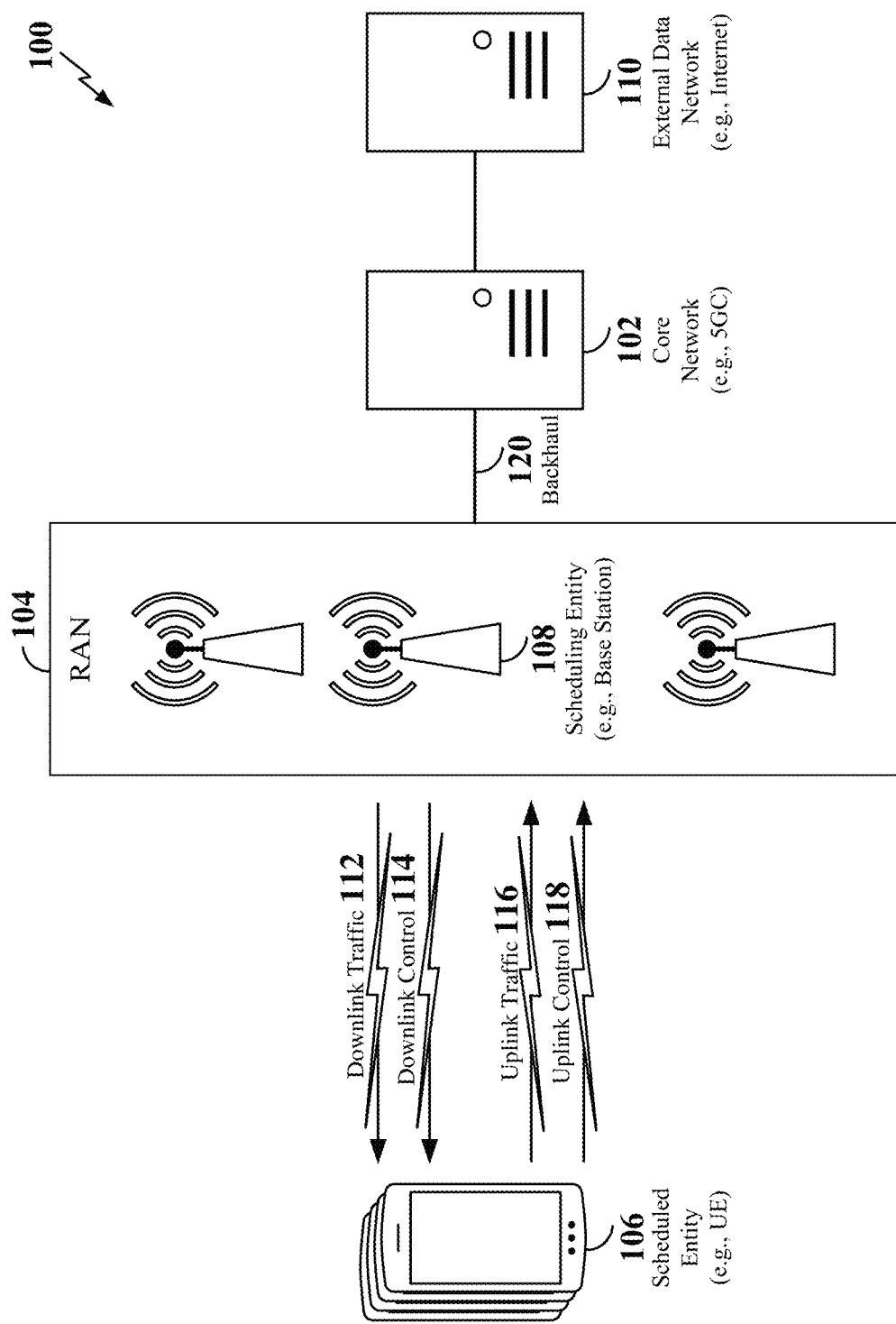
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects relate generally to determining a preparation time for at least one transmission on at least one carrier of a multi-carrier communication system. For example, a base station or a user equipment (UE) may estimate or otherwise determine an uplink transmission preparation time needed by the UE to perform an uplink transmission to the base station. In particular aspects, the preparation time accounts for or includes a duration of time needed by the UE to switch between different transmission modes involving one or more radio frequency (RF) carriers. The transmission may be a physical uplink shared channel (PUSCH) transmission, a channel state information (CSI) transmission, or some other type of UE transmission. In some implementations, the base station may determine timing for transmitting a grant based on the determined preparation time. For example, the base station may transmit a grant to the UE at a time prior to a transmission mode switch, where the grant transmission time is based on the determined preparation time.

In some particular implementations, the base station may estimate the preparation time for a transmission (e.g., a PUSCH transmission or a CSI transmission) by the UE by selecting the longer of two preparation time estimates. In some implementations, the base station may estimate a first preparation time for a first RF carrier and estimate a second preparation time for a second RF carrier. The base station may then select the longest preparation time from the first preparation time and the second preparation time.

In some particular implementations, the base station may estimate the preparation time for a transmission (e.g., a PUSCH transmission or a CSI transmission) by the UE based on a subcarrier spacing (SCS) index. In some examples, the base station may select an SCS index from the SCS indexes for a first RF carrier and a second RF carrier that results in the longest estimated preparation time. For example, the base station may select the lowest SCS index from a first SCS index for the first RF carrier and a second SCS index for the second RF carrier.

In some particular implementations, the base station may estimate the preparation time for a transmission by the UE by adding a defined value to an equation used for estimating preparation time. For example, the base station may determine whether a grant will cause a UE to switch an uplink transmission mode. If so, the base station may estimate the preparation time using the defined value. On the other hand, if the grant will not cause the UE to switch an uplink transmission mode, the base station may estimate the preparation time without using the defined value (or by setting the defined value to 0 for the preparation time estimation).

Various aspects also relate to configuring a UE to process a received grant within a preparation time. For example, the UE may estimate the minimum preparation time needed for receiving a grant. This preparation time may include, for example, any one or more of the amount of time it takes the UE to decode a grant, the amount of time it takes the UE to generate a transmission, the amount of time it takes the UE to switch between transmission modes, or the amount of time the UE will wait for a valid transmission time in a transmission pipeline. After estimating the preparation time, the UE may configure at least one component to ensure that the UE is able to process a received grant prior to the transmission time (e.g., a slot) specified by the grant. For example, the UE may adjust the frequency of a clock that controls the rate at which the UE performs receive operations. As another example, the UE may adjust a memory allocation to enable the UE to more quickly process received information.

Particular aspects of the subject matter described in this disclosure can be implemented to realize one or more of the following potential advantages. In some examples, the described techniques can be used to ensure that a base station estimates an uplink transmission preparation time that is sufficiently long, such that the base station may transmit a grant to a UE sufficiently in advance of a scheduled uplink transmission, to enable the UE to prepare for the uplink transmission on one RF carrier or on multiple RF carriers.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. The description that follows provides illustrative examples, without limitation, of various aspects of the present disclosure.

FIG. 1 is a schematic illustration of a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per subcarrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
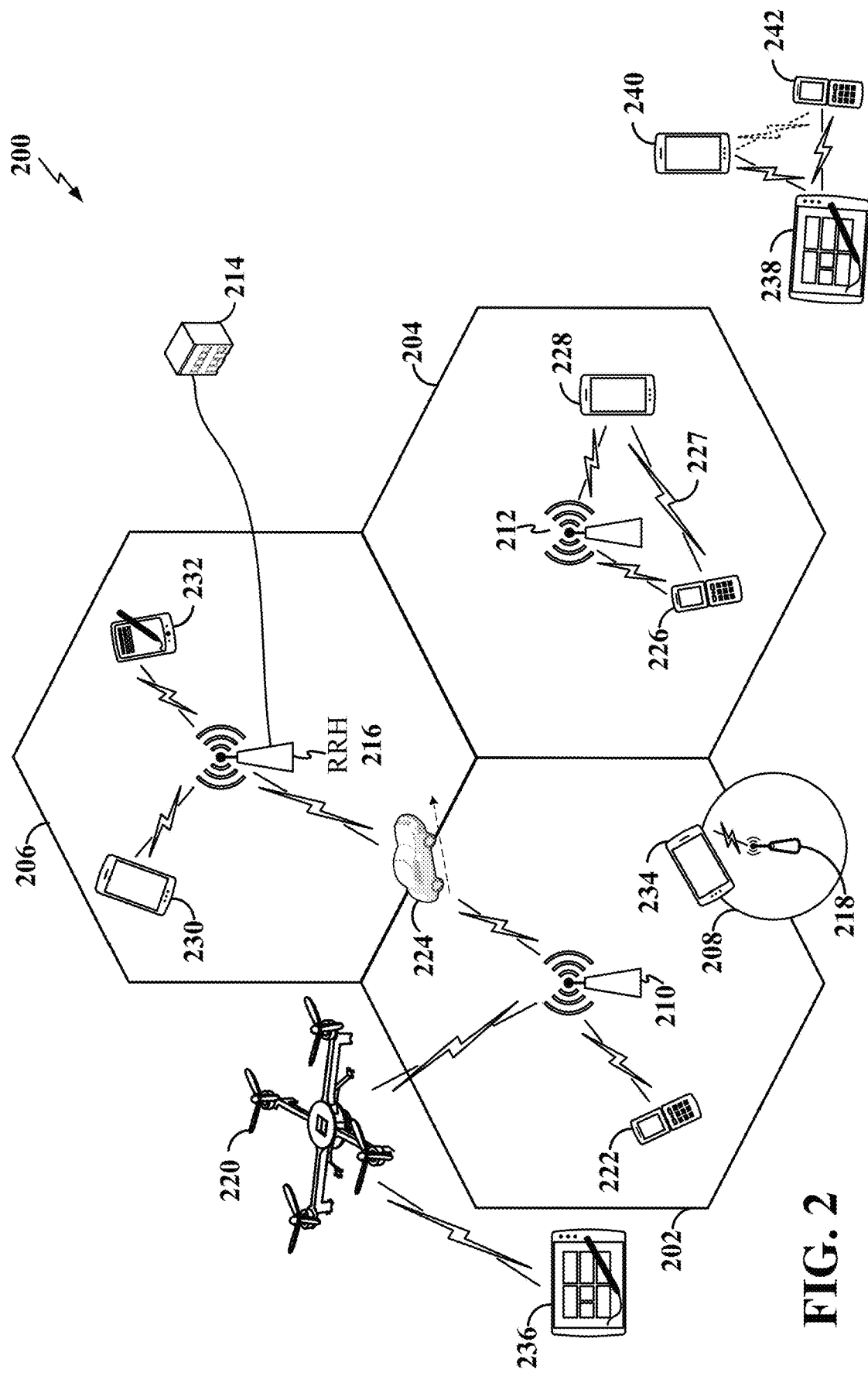
FIG. 2 is a conceptual illustration of an example of a radio access network (RAN).

FIG. 2 is a conceptual illustration of an example of a radio access network (RAN) 200. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells.

Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancelation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
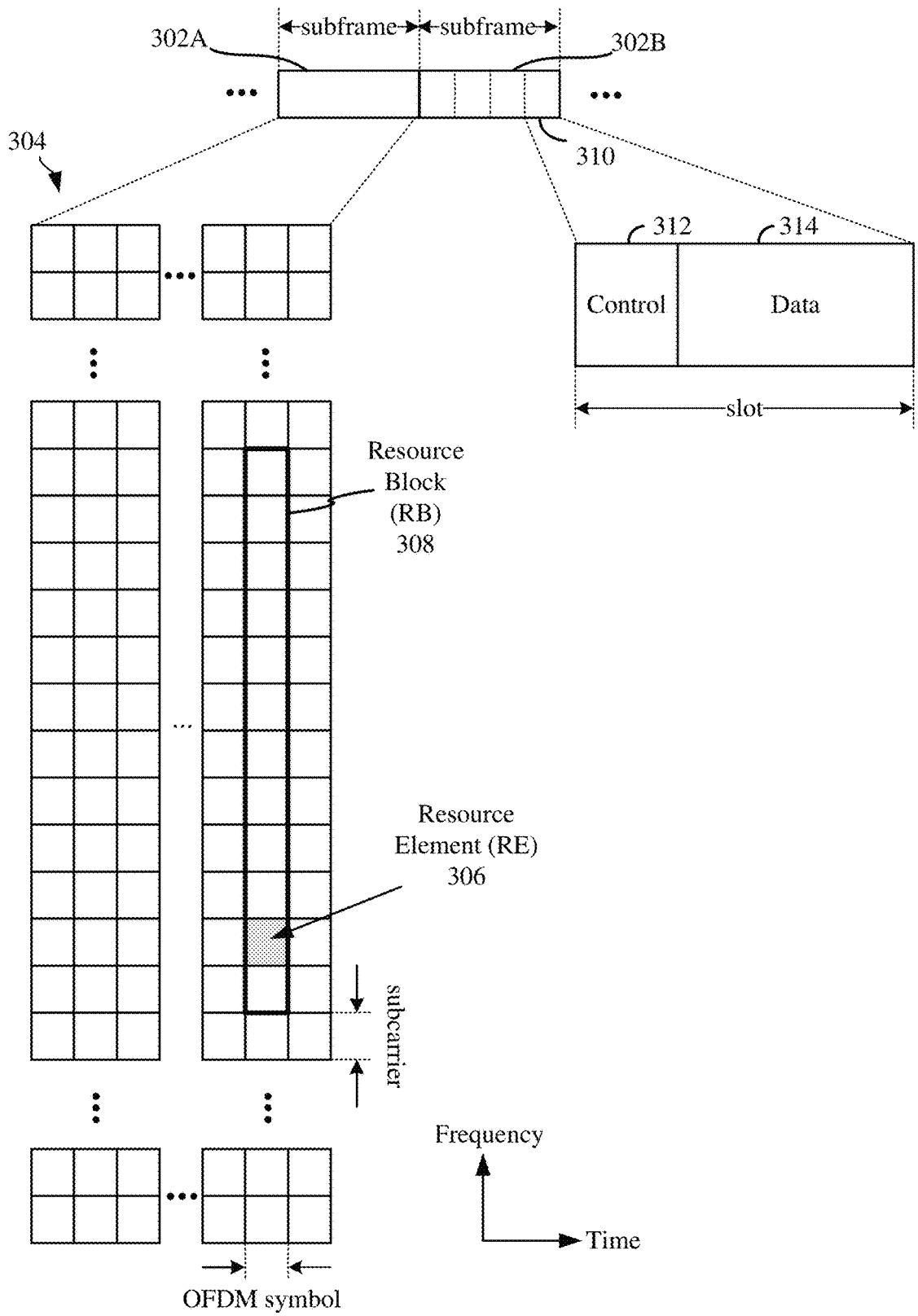
FIG. 3 is a schematic illustration of wireless resources in an air interface utilizing orthogonal frequency divisional multiplexing (OFDM).

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

FIG. 3 is a schematic illustration of wireless resources in an air interface utilizing orthogonal frequency divisional multiplexing (OFDM). In FIG. 3, an expanded view of an example DL subframe (SF) 302A is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more bandwidth parts (BWPs), where each BWP includes two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

5G-NR networks may further support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a carrier frequency (or band) utilized for communication within a cell.

Figure 4:
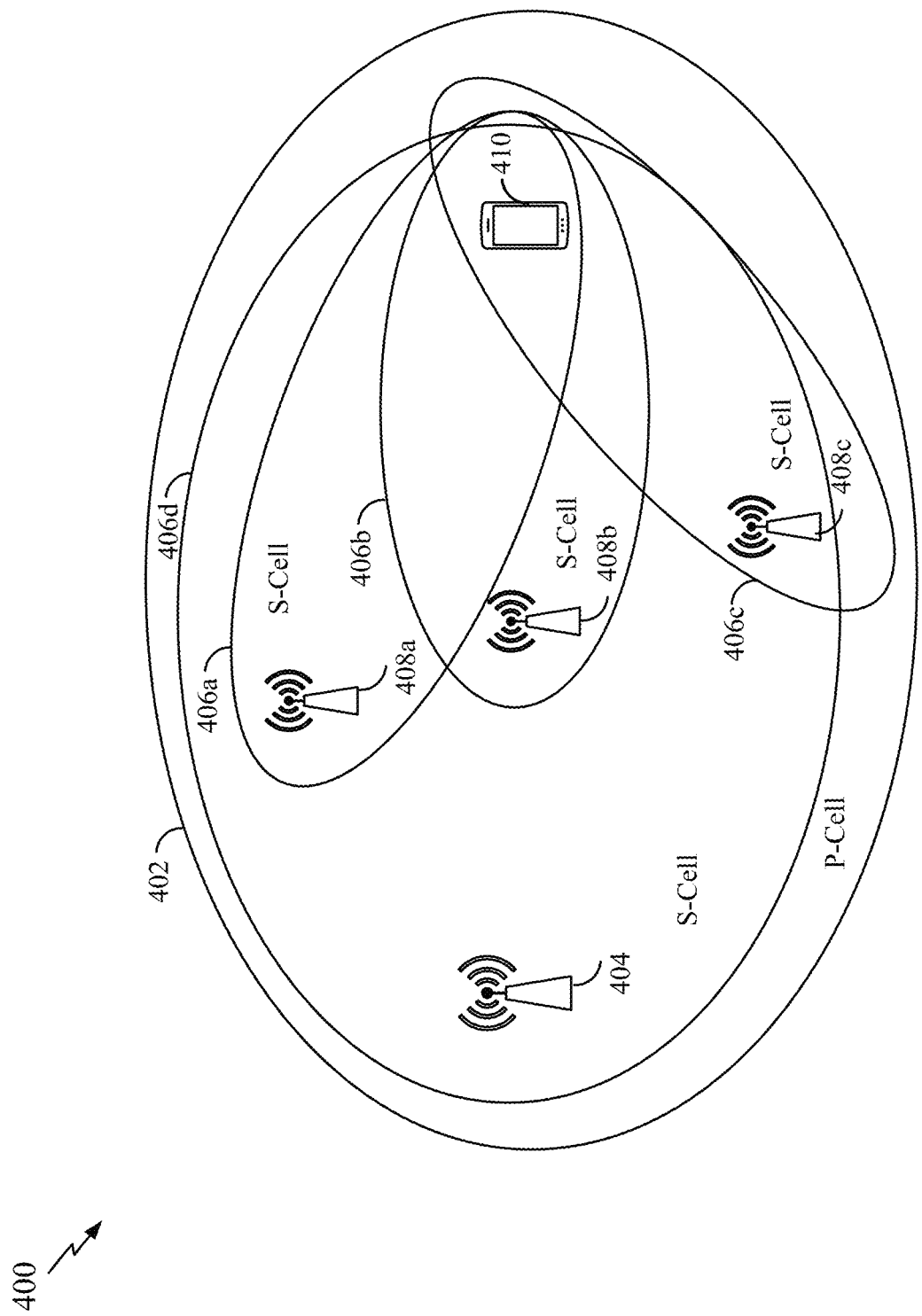
FIG. 4 is a conceptual illustration of a wireless communication system that shows a base station (BS) and a user equipment (UE) communicating via multiple radio frequency (RF) carriers according to some aspects of the disclosure.

FIG. 4 is a conceptual illustration of a wireless communication system that shows a base station (BS) and a user equipment (UE) communicating via multiple carriers according to some aspects of the disclosure. In particular, FIG. 4 shows an example of a multi-cell transmission environment 400 that includes a primary serving cell (PCell) 402 and one or more secondary serving cells (SCells) 406a, 406b, 406c, and 406d. The PCell 402 may be referred to as the anchor cell that provides a radio resource control (RRC) connection to the UE. In some examples, the PCell and the SCell may be co-located (e.g., different TRPs at the same location).

When carrier aggregation is configured, one or more of the SCells 406a-406d may be activated or added to the PCell 402 to form the serving cells serving a user equipment (UE) 410. Each serving cell corresponds to a component carrier (CC). The CC of the PCell 402 may be referred to as a primary CC, and the CC of a SCell 406a-406d may be referred to as a secondary CC. The PCell 402 and one or more of the SCells 406 may be served by a respective base station 404 and 408a-408c or scheduling entity similar to those illustrated in any of FIGS. 1 and 2. In the example shown in FIG. 4, SCells 406a-406c are each served by a respective base station 408a-408c. SCell 406d is co-located with the PCell 402. For example, the base station 404 may include multiple TRPs, each supporting a different carrier. The coverages of the PCell 402 and SCell 406d may differ since component carriers in different frequency bands may experience different path loss.

In some examples, the PCell 402 may add or remove one or more of the SCells 406a-406d to improve reliability of the connection to the UE 410 and/or increase the data rate. The PCell 402 may be changed upon a handover to another PCell.

In some examples, the PCell 402 may utilize a first radio access technology (RAT), such as LTE, while one or more of the SCells 406 may utilize a second RAT, such as 5G-NR. In this example, the multi-cell transmission environment may be referred to as a multi-RAT-dual connectivity (MR-DC) environment. On example of MR-DC is Evolved-Universal Terrestrial Radio Access Network-New Radio dual connectivity (EN-DC) mode that enables a UE to simultaneously connect to an LTE base station and a NR base station to receive data packets from and send data packets to both the LTE base station and the NR base station.

In some examples, the PCell 402 may be a low band cell, and the SCells 406 may be high band cells. A low band (LB) cell uses a CC in a frequency band lower than that of the high band cells. For example, the high band cells may use millimeter wave (mmW) CC, and the low band cell may use a CC in a band (e.g., sub-6 GHz band) lower than mmW. In general, a cell using a mmW CC can provide greater bandwidth than a cell using a low band CC. In addition, when using a frequency carrier that is above 6 GHz (e.g., mmW), beamforming may be used to transmit and receive signals in some examples.

The disclosure relates in some aspects to determining a preparation time for at least one transmission on at least one RF carrier. A BS may schedule a UE to transmit on different RF carriers during different time slots. In some cases, this scheduling may result in the UE switching from a first transmission mode to a second transmission mode, or vice versa.

For example, in the first transmission mode the UE may be configured to use a first transmit chain to transmit on a first RF carrier and configured to not transmit on the second RF carrier, while in the second transmission mode the UE may be configured to use the first transmit chain to transmit on the first RF carrier and configured to use a second transmit chain to transmit on the second RF carrier. As another example, in the first transmission mode the UE may be configured to use the first transmit chain to transmit on the first RF carrier and configured to not transmit on the second RF carrier, while in the second transmission mode the UE may be configured to use the first transmit chain to transmit on the second RF carrier and configured to not transmit on the first RF carrier. Other examples are possible.

As a specific example, network operators may aggregate bands n78 (3.5 GHz) and n1 (2.1 GHz). To enable UL MIMO in band n78 for a UE that has two transmit (Tx) chains, the feature of UL 1 Tx to 2 Tx switching (e.g., switching from transmitting using one transmit (TX) chain to transmitting using two Tx chains, or vice versa) may be used.

Figure 5:
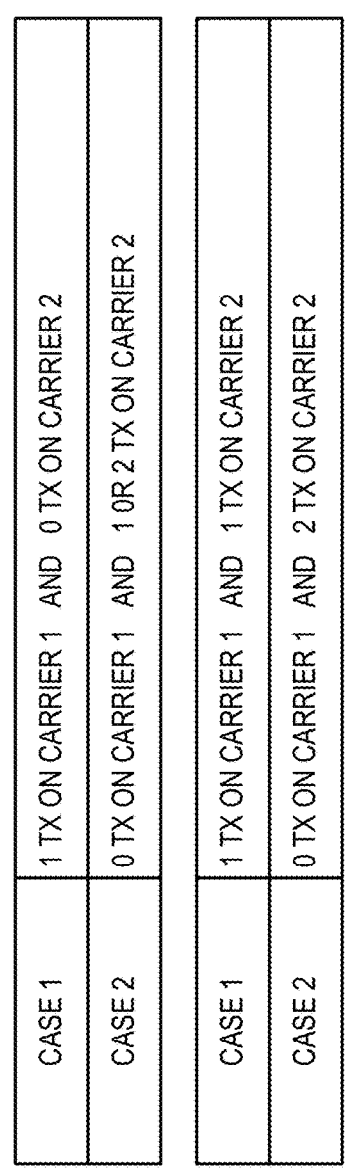
FIG. 5 is a schematic illustration of carriers and slots for wireless communication that shows that a UE may use different transmission modes in a multi-carrier scenario and that a BS may send a grant to a UE a certain period of time prior to a transmission mode switch according to some aspects of the disclosure.
Figure 5:
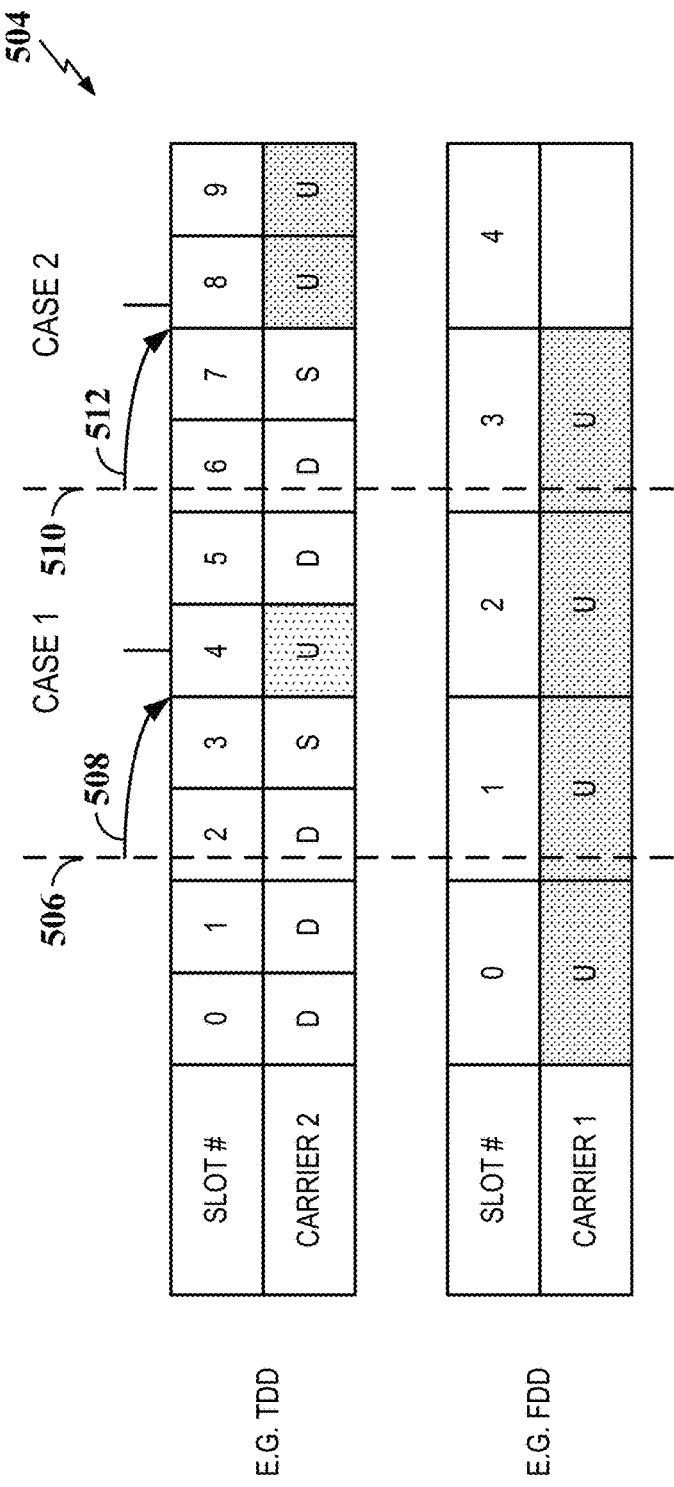

FIG. 5 is a schematic illustration of carriers and slots for wireless communication that shows that a UE may use different transmission modes in a multi-carrier scenario and that a BS may send a grant to a UE a certain period of time prior to a transmission mode switch according to some aspects of the disclosure. FIG. 5 illustrates an example of two options 502 for such switching.

The first option (option 1) has two cases. In the first case (case 1), the UE uses one Tx chain to transmit on carrier 1 (e.g., CC1) and does not transmit on carrier 2 (e.g., CC2). In the second case (case 2) for option 1, the UE uses one Tx chain or two Tx chains to transmit on carrier 2 (e.g., CC2) and does not transmit on carrier 1 (e.g., CC1).

The second option (option 2) also has two cases. In the first case (case 1), the UE uses a first Tx chain to transmit on carrier 1 (e.g., CC1) and uses a second Tx chain to transmit on carrier 2 (e.g., CC2). In the second case (case 2) for option 2, the UE uses two Tx chains to transmit on carrier 2 (e.g., CC2) and does not transmit on carrier 1 (e.g., CC1).

FIG. 5 also illustrates an example 504 of two carriers on which a BS and a UE may use option 1 or option 2. A first carrier (carrier 1) is an FDD carrier configured for uplink transmissions in this example. A second carrier (carrier 2) is a TDD carrier in this example. In some examples, one carrier may be an NR carrier and the other carrier may be an LTE carrier. In some examples, one carrier may use a sub-6-GHz band and the other carrier may use a millimeter wave (mmW) frequency band. In some examples, one carrier may use Frequency Range 1 (FR1) and the other carrier may use Frequency Range 2 (FR2). In some examples, one carrier may be an NR carrier and the other carrier may be an LTE carrier. The first and second carriers could take other forms in other examples.

As indicated by the respectively lengths of the slots for carrier 1 and carrier 2, the communication on these carriers may use different SCSs. As one non-limiting example, a 15 kHz SCS may be used on carrier 1 and a 30 kHz SCS may be used on carrier 2. Other SCSs may be used in other examples.

In the example of FIG. 5, a BS scheduled a UE to transmit on slots 0, 1, 2, and 3 of carrier 1. In addition, the BS scheduled the UE to transmit on slots 4, 8, and 9 of carrier 2.

At slot 2 of carrier 1 (slot 4 of carrier 2), the UE switches to case 1 of option 2. In addition, at slot 4 of carrier 1 (slot 8 of carrier 2), the UE switches to case 2 of option 2.

Various requirements may be specified for UE switching (e.g., between case 1 and case 2 as shown in FIG. 5) for two uplink carriers (e.g., for Inter-band UL CA, for supplementary UL (SUL) without EN-DC, and for Inter-band EN-DC without SUL). For example, to accommodate such a switch, a BS should sent the grant that indicates (e.g., schedules) the switch a sufficient amount of time before the switch to allow the UE to process the grant and prepare for the switch. For example, a UE may need a sufficiently long preparation time for DL scheduling decoding (e.g., decoding the grant from the BS), UL signal generating (e.g., retrieving information from memory and encoding the information), and waiting for a valid Tx time in the UL Tx pipeline (e.g., waiting for a valid beginning of Tx; which may correspond to the completion of the last UL Tx).

As one example, the BS may need to send the grant for slot 2 of carrier 1 (slot 4 of carrier 2) at or before a time represented by a first dashed line 506. As indicated by a first arrow 508, this time should precede the scheduled slot(s) by an amount of time that is greater than the processing time required by the UE to decode the grants, etc., to transmit during the slot(s).

As another example, the BS may need to send the grant for slot 4 of carrier 1 (slot 8 of carrier 2) at or before a time represented by a second dashed line 510. As indicated by a second arrow 512, this time also should precede the scheduled slot(s) by an amount of time that is greater than the processing time required by the UE to decode the grants, etc., to transmit during the slot(s).

The preparation time for the UE to transmit on a first RF carrier may be different from the preparation time for the UE to transmit on a second RF carrier. For example, transmissions on the first RF carrier may use a first sub-RF carrier spacing (SCS), while transmissions on the second RF carrier may use a second SCS that is different from the first SCS. This difference in SCS may affect the amount of time it takes the UE to prepare for a transmission (e.g., an uplink preparation time).

Different SCSs may be associated with different SCS indexes. For example, an SCS of 15 kHz may be associated with an SCS index of 0, an SCS of 30 kHz may be associated with an SCS index of 1, an SCS of 60 kHz may be associated with an SCS index of 2, and so on.

A BS may determine (e.g., estimate) the preparation time for at least one transmission by a UE so that the BS will send a grant for the at least one transmission to the UE a sufficient amount of time before the at least one transmission is scheduled to occur. For example, the base station may execute a preparation time formula to calculate the preparation time for at least one transmission by a UE. This preparation formula may include, in part, on an SCS index parameter.

The disclosure relates in some aspects to determining a preparation time for at least one PUSCH transmission. 3GPP Rel. 15 defines a PUSCH preparation time (e.g., computation time) as set forth in Equation 1:

$$T_{proc,2} = \max((N_2 + d_{2,1})(2048+144) \cdot k2^{-\mu} \cdot T_C, d_{2,2})  \quad \text{EQUATION 1}$$

$N_2$ is based on the SCS index ($\mu$) of Table 6.4-1 and Table 6.4-2 of TS 38.211 for UE processing capability 1 and 2, respectively, where $\mu$ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and K is defined in subclause 4.1 of TS 38.211.

For UL Tx switching, the conventional PUSCH preparation time might not be sufficient as the switching transition period is not marginal. In some examples, a defined value may be added to Equation 1 to accommodate the switching time as shown in Equation 2 and, alternatively, in Equation 3:

$$T_{proc,2} = \max((N_2 + \text{switch\_time} + d_{2,1})(2048+144) \cdot K2^{-\mu} \cdot T_C, d_{2,2})  \quad \text{EQUATION 2}$$

$$T_{proc,2} = \max((N_2 + d_{2,1})(2048+144) \cdot k2^{-\mu} \cdot T_C + \text{switch\_time}, d_{2,2})  \quad \text{EQUATION 3}$$

In Equations 2 and 3, the parameter switch_time is a defined value (e.g., a constant) that is used to accommodate the switching time. In some examples, $\mu$ is the lower of ($\mu_{DL}$, $\mu_{UL}$), where $\mu_{DL}$ is the lowest SCS among BWPs of the RF carrier and $\mu_{UL}$ is the lowest SCS among BWPs of the RF carrier.

According to an additional aspect of the disclosure, a BS may estimate a preparation time for at least one uplink transmission by a UE by selecting the smallest subcarrier spacing (SCS) index of different RF carriers and using the selected SCS index in a preparation time calculation. In some implementations, a BS may determine an SCS index from the SCS indexes for a first RF carrier and a second RF carrier that results in the BS calculating the longer preparation time. For example, the BS may select the lowest SCS index from a first SCS index for the first RF carrier and a second SCS index for the second RF carrier. The BS then calculates a preparation time based on the selected SCS index. In this way, the preparation time determined (estimated) by the BS will be long enough to enable the UE to prepare for a transmission on either RF carrier or both RF carriers.

As a specific example, CC1 and CC2 may have different SCSs. For example, CC1 may have a 15 kHz SCS while CC2 may have a 30 kHz SCS. Equation 2 or 3 (including a constant to accommodate switching time) may be used to calculate the uplink preparation time (e.g., uplink processing time) $T_{proc,2}$ in some implementations.

To obtain a preparation time that is sufficiently long to enable the UE to prepare for the transmission(s), the selection of $\mu$ takes both carriers into account. This is to ensure that the selected value will provide the UE with sufficient time on each carrier. For example, the selection of $\mu$ may be based on the lower SCS of the SCS for the CC1 UL and the CC2 UL. In some examples, $\mu$ corresponds to the one of ($\mu_{DL}$, $\mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the lower one between the lowest value among all the UL BWPs of carrier 1 and the lowest value among all the UL BWPs of carrier 2.

According to an additional aspect of the disclosure, a BS may determine a preparation time for at least one uplink transmission on multiple RF carriers by taking both RF carriers into account. For example, to obtain a preparation time that is sufficiently long to enable the UE to prepare for an uplink transmission(s) by the UE, the determination of the preparation time may be based on the preparation time of each RF carrier. This is to ensure that the determined preparation time will provide the UE with sufficient time on either carrier.

In some examples, a BS may determine a first preparation time for the first RF carrier and a second preparation time for the second RF carrier and then select the longest preparation time to control when a grant is transmitted. In this way, the preparation time determined (estimated) by the BS will be long enough to enable the UE to prepare for a transmission on either RF carrier or both RF carriers.

As a specific example, CC1 and CC2 may have different processing times (e.g., to CC1 and CC2 having different SCSs). For example, CC1 may have a 15 kHz SCS while CC2 may have a 30 kHz SCS. Equation 2 or 3 (each including a constant to accommodate switching time) may be used to calculate the uplink preparation time (e.g., uplink processing time $T_{proc,2}$) for each CC. That is, an uplink preparation time $T_{proc,2,CC1}$ is calculated for CC1 and an uplink preparation time $T_{proc,2,CC2}$ is calculated for CC2. Equation 4 may then be used to select the longer of $T_{proc,2,CC2}$ and $T_{proc,2,CC2}$:

$$T_{proc,CSI} = \max(T_{proc,CSI,CC1}, T_{proc,CSI,CC2})  \quad \text{EQUATION 4}$$

In some aspects, a BS (e.g., a gNB) may ensure that there is enough time for switching. For example, $T_{proc,2}$ for PUSCH and $T_{proc,2}$ for switching may be different. In this case, BS may ensure that no switching is triggered if the transmission of the PUSCH grant would meet the preparation time requirement for $T_{proc,2}$ for PUSCH but not $T_{proc,2}$ for switching. For example, upon determining that both preparation time requirements would not be met if a grant that results in a transmission mode switch at the UE was sent, the base station may elect to instead send a different grant that does not result in a transmission mode switch at the UE.

According to an additional aspect of the disclosure, a BS may determine a preparation time for at least one CSI transmission. 3GPP Rel. 15 defines a CSI preparation time (e.g., computation time) as set forth in Equation 5:

$$T_{proc,CSI} = (Z)(2048+144) \times k2^{-\mu} \cdot T_c \qquad \text{EQUATION 5}$$

An example of the parameter μ of Equation 5 is set forth in table 5.4-1 and table 5.4-2 of TS 38.211, reproduced in Tables 1 and 2 below. In some aspects, μ corresponds to the min ($\mu_{PDCCH}$, $\mu_{CSI-RS}$, $\mu_{UL}$) where the μPDCCH corresponds to the subcarrier spacing of the PDCCH with which the DCI was transmitted and put corresponds to the subcarrier spacing of the PUSCH with which the CSI report is to be transmitted and $\mu_{CSI-RS}$ corresponds to the minimum subcarrier spacing of the aperiodic CSI-RS triggered by the DCI.

TABLE 1

| | $Z_1$ [symbols] | |
|---|---|---|
| μ | $Z_1$ | $Z'_2$ |
| 0 | 10 | 8 |
| 1 | 13 | 11 |
| 2 | 25 | 21 |
| 3 | 43 | 36 |

TABLE 2

| | $Z_1$ [symbols] | | $Z_2$ [symbols] | | $Z_2$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | Min(44, $X_2$ + $KB_1$) | $X_2$ |
| 3 | 97 | 85 | 152 | 140 | Min(97, $X_3$ + $KB_2$) | $X_3$ |

For UL Tx switching, the conventional CSI preparation time might not be sufficient.

According to an additional aspect of the disclosure, a BS may determine a preparation time for at least one CSI transmission by modifying a preparation time calculation to accommodate a transmission mode switch. For examples, a defined value (e.g., a constant) may be added to Equation 5 to accommodate the switching time. Two examples of modifications of Equation 5 are shown in Equation 6 and, alternatively, in Equation 7:

$$T_{proc,CSI,CC1} = (Z + \text{switch\_time})(2048+144) \cdot k2^{-\mu} \cdot T_c \qquad \text{EQUATION 6}$$

$$T_{proc,CSI,CC1} = (Z)(2048+144) \cdot k2^{-\mu} \cdot T_c + \text{switch\_time} \qquad \text{EQUATION 7}$$

In Equations 6 and 7, the parameter switch_time is a defined value (e.g., a constant) that is used to accommodate the switching time. In some examples, μ is min (μPDCCH, $\mu_{CSI-RS}$, $\mu_{UL}$) where $\mu_{UL}$ is the lowest SCS among BWPs of the carrier. In some aspects, the parameter Z may be as defined as in Tables 1 and 2 above. In some examples, the parameter Z could represent $T_{proc,CSI}$.

According to an additional aspect of the disclosure, a BS may determine a preparation time for at least one CSI transmission on multiple RF carriers by taking both RF carriers into account. For example, to obtain a preparation time that is sufficiently long to enable the UE to prepare for CSI transmission(s) by the UE, the determination of the preparation time may be based on the preparation time of each RF carrier. This is to ensure that the determined preparation time will provide the UE with sufficient time on either carrier.

In some examples, a BS may determine a first preparation time for the first RF carrier and a second preparation time for the second RF carrier and then select the longest preparation time to control when a grant is transmitted. In this way, the preparation time determined (estimated) by the BS will be long enough to enable the UE to prepare for a transmission on either RF carrier or both RF carriers.

As a specific example, CC1 and CC2 may have different CSI-related processing times. Equation 6 or 7 (each including a constant to accommodate switching time) may be used to calculate the uplink preparation time (e.g., uplink processing time $T_{proc,CSI}$) for each CC. That is, using Equation 6 or 7, a preparation time $T_{proc,CSI,CC1}$ is calculated for CC1 and a preparation time $T_{proc,CSI,cc2}$ is calculated for CC2. Equation 8 may then be used to select the longer of $T_{proc,CSI,CC2}$ and $T_{proc,CSI,CC2}$:

$$T_{proc,CSI} = \max(T_{proc,CSI,CC1}, T_{proc,CSI,CC2}) \qquad \text{EQUATION 8}$$

In some aspects, a BS (e.g., a gNB) may ensure that there is enough time for switching. For example, $T_{proc,CSI}$ for CSI computation and $T_{proc,CSI}$ for Tx switching may be different. In this case, BS may ensure that no switching is triggered if the transmission of the PUSCH grant for SCI would meet the preparation time requirement for $T_{proc,CSI}$ for CSI computation but not $T_{proc,CSI}$ for Tx switching. For example, upon determining that both preparation time requirements would not be met if a grant that results in a transmission mode switch at the UE was sent, the base station may elect to instead send a different grant that does not result in a transmission mode switch at the UE.

According to an additional aspect of the disclosure, a BS may estimate a preparation time for at least one CSI transmission by a UE by selecting the smallest subcarrier spacing (SCS) index of different RF carriers and using the selected SCS index in a preparation time calculation. In some implementations, a BS selects an SCS index from the SCS indexes for a first RF carrier and a second RF carrier that results in the BS generating the longer preparation time for at least one CSI transmission. For example, the BS may select the lowest SCS index from a first SCS index for the first RF carrier and a second SCS index for the second RF carrier. The BS then calculates a preparation time based on the selected SCS index. In this way, the preparation time determined (estimated) by the BS will be long enough to enable the UE to prepare for a CSI transmission on either RF carrier or both RF carriers.

As a specific example, CC1 and CC2 may have different SCSs. For example, CC1 may have a 15 kHz SCS while CC2 may have a 30 kHz SCS. Equation 6 or 7 (including a constant to accommodate switching time) may be used to calculate the CSI preparation time (e.g., CSI processing time) $T_{proc,CSI}$.

To obtain a preparation time that is sufficiently long to enable the UE to prepare for the CSI transmission(s), the selection of μ takes both carriers into account. This is to ensure that the selected value will provide the UE with sufficient time on each carrier. For example, the selection of μ may be based on the lower SCS of the SCS for the CC1 UL and the CC2 UL. In some examples, μ corresponds to the min ($\mu_{PDCCH}$, $\mu_{CSI-RS}$, $\mu_{UL}$) where the $\mu_{PDCCH}$ corresponds to the subcarrier spacing of the PDCCH with which the DCI was transmitted and put corresponds to the subcarrier spacing of the lower one between the lowest value among all the UL BWPs of carrier 1 and the lowest value among all the UL BWPs of carrier 2, and $\mu_{CSI-RS}$ corresponds to the minimum subcarrier spacing of the aperiodic CSI-RS triggered by the DCI The techniques described herein may be implemented in a variety of wireless communication architectures and configurations. For example, in some implementations, a BS and a UE may employ a CA scheme where the BS and the UE communicate via several CCs. In this case, if the BS sends a grant to the UE that results in the UE switching from one transmission mode to another (i.e., switching from transmitting on one CC to transmitting on another CC), the BS may estimate the preparation time for a UE transmission on at least one of the CCs using the techniques describe herein. In some examples, such a CA scheme may be implemented using one of two options. The first option (CA option 1) does not allow simultaneous transmission on CC1 and CC2. For example, in CA option 1, case 1 of option 2 of FIG. 5 is not allowed. The second option (CA option 2) allows simultaneous transmission on CC1 and CC2. For example, in CA option 2, case 1 of option 2 of FIG. 5 is allowed.

In some implementations, a BS and a UE may employ an SUL scheme where the BS and the UE communicate via several (e.g., two) uplink carriers. In this case, if the BS sends a grant to the UE that results in the UE switching from one transmission mode to another (i.e., switching from transmitting on one uplink carrier to transmitting on another uplink carrier), the BS may estimate the preparation time for a UE transmission on at least one of the uplink carriers using the techniques describe herein. In some examples, such an SUL scheme does not allow simultaneous transmission on multiple uplink carriers. For example, case 1 of option 2 of FIG. 5 is not allowed.

The RF carriers (e.g., CCs) described herein may take different form in different examples. In some examples, all of the RF carrier may be sub-6-GHz carriers. In some examples, the RF carriers may be sub-6-GHz carriers and/or millimeter wave (mmW) carriers. For example, a first RF carrier may be a sub-6-GHz carrier and a second RF carrier may be a mmW carrier. As another example, all of the RF carriers may be mmW carriers.

The above techniques are not limited to two-carrier systems. Rather, the techniques described herein may be applicable to multi-carrier systems in general (e.g., more than 2 CCs). For example, in some implementations, a BS and a UE may employ a CA scheme where the BS and the UE communicate via several three or more CCs. In this case, if the BS sends a grant to the UE that results in the UE switching from one transmission mode to another (i.e., switching from transmitting on a first CC to transmitting on a second CC), the BS may estimate the preparation time for a UE transmission on at least one of these two CCs using the techniques describe herein.

Figure 6:
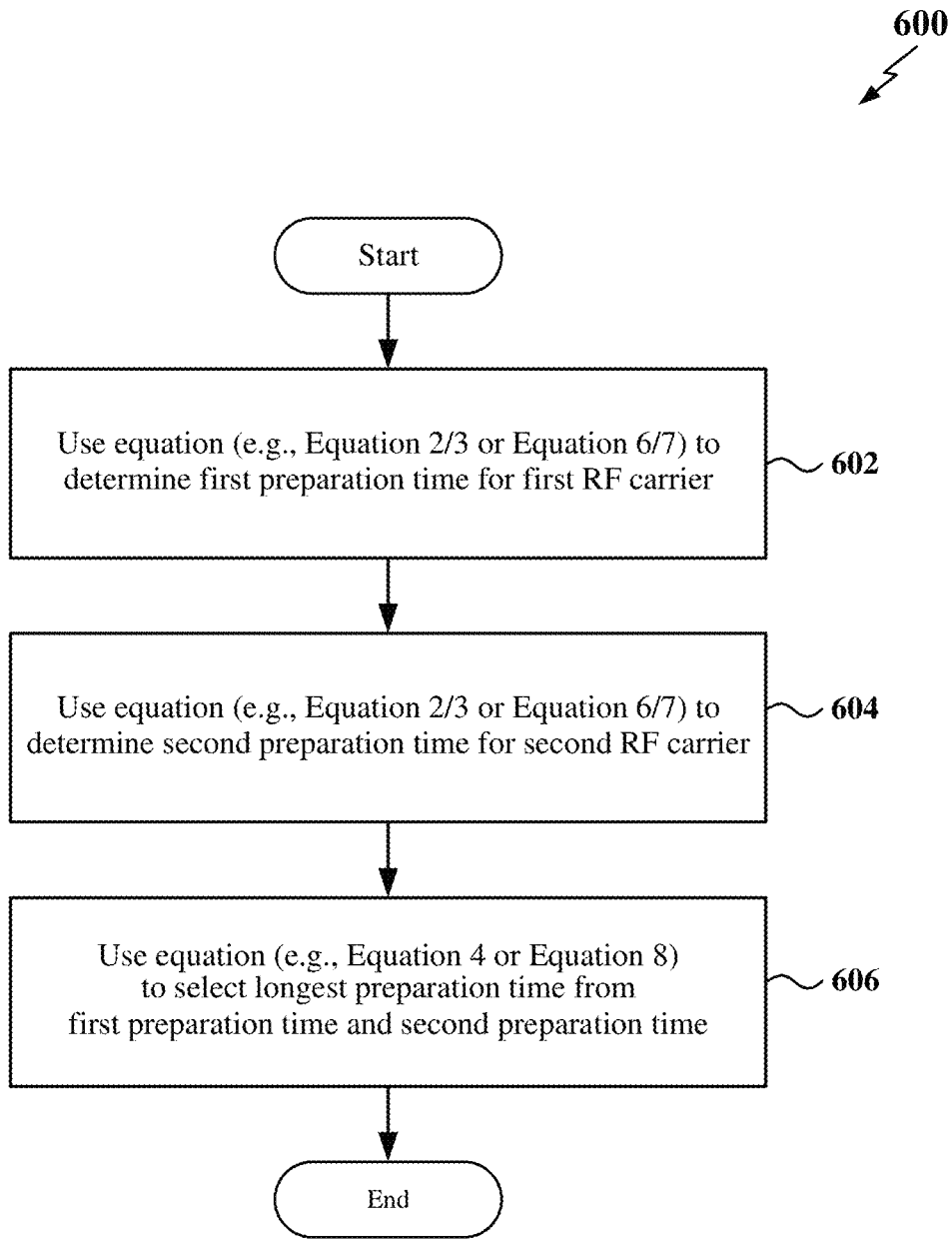
FIG. 6 is a flow chart that shows a BS determining a preparation time by selecting the larger of two preparation times according to some aspects of the disclosure.

FIG. 6 is a flow chart that shows a BS determining a preparation time by selecting the larger of two preparation times according to some aspects of the disclosure. As described herein, some or all illustrated features may be omitted in a particular implementation within the scope of the present disclosure, and some illustrated features may not be required for implementation of all embodiments. In some examples, the process 600 may be carried out by the BS 900 illustrated in FIG. 9. In some examples, the process 600 may be carried out by any suitable apparatus or means for carrying out the functions or algorithm described below.

At block 602, a BS may use a first equation to determine a first preparation time for a first RF carrier. For example, the BS may use Equation 2 or 3 to calculate a preparation time for a PUSCH transmission on a first component carrier. As another example, the BS may use Equation 6 or 7 to calculate a preparation time for a CSI transmission on a first component carrier.

At block 604, the BS may use the first equation to determine a second preparation time for a second RF carrier. For example, the BS may use Equation 2 or 3 to calculate a preparation time for a PUSCH transmission on a second component carrier. As another example, the BS may use Equation 6 or 7 to calculate a preparation time for a CSI transmission on a second component carrier.

At block 606, the BS may use a second equation to select the longest preparation time from the first preparation time and the second preparation time. For example, the BS may use Equation 4 to determine the preparation time to use for sending a grant for a PUSCH transmission. As another example, the BS may use Equation 8 to determine the preparation time to use for sending a grant for a CSI transmission.

Figure 7:
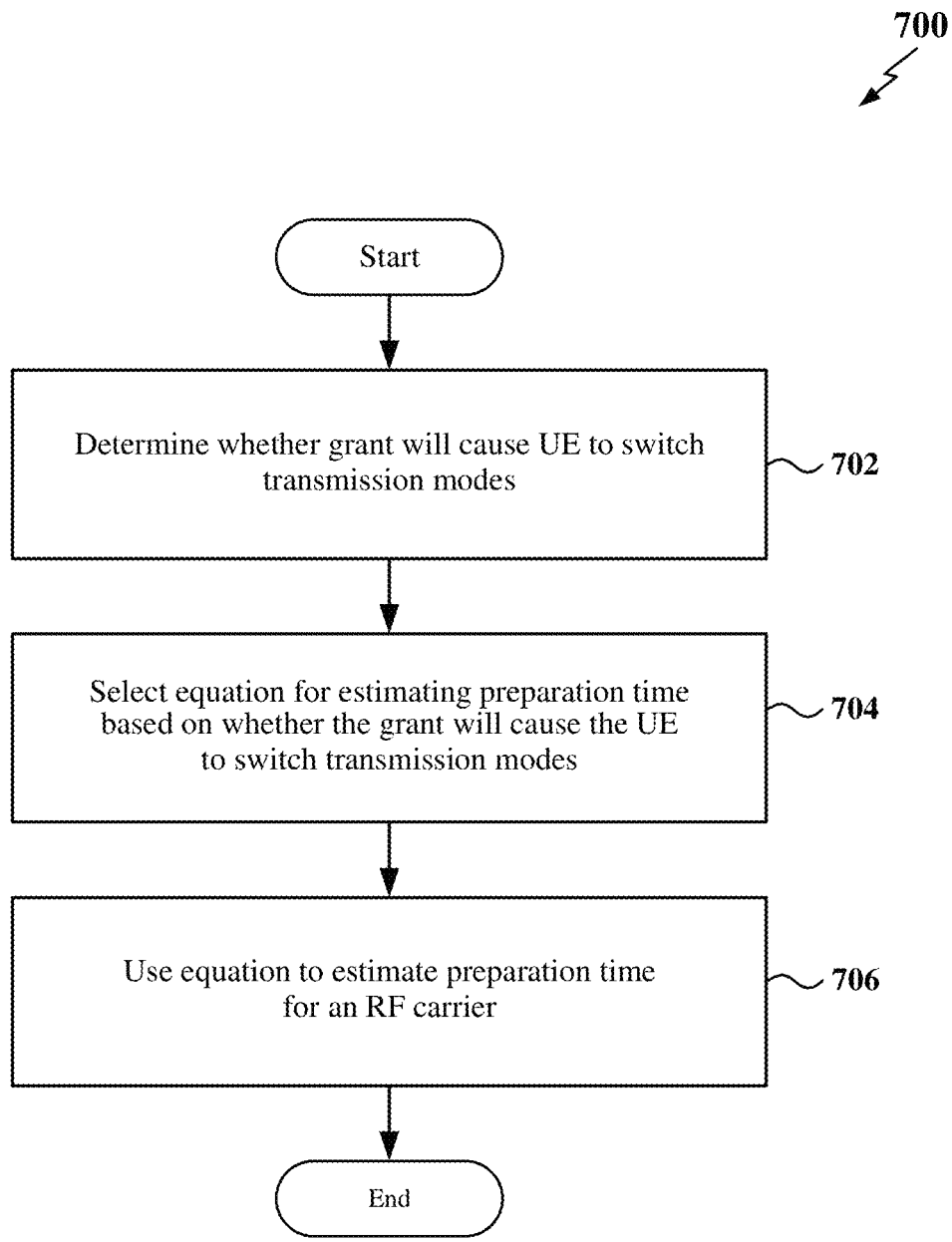
FIG. 7 is a flow chart that shows a BS determining a preparation time by adding a default value to a preparation time calculation according to some aspects of the disclosure.

FIG. 7 is a flow chart that shows a BS determining a preparation time by adding a default value to a preparation time calculation according to some aspects of the disclosure. As described herein, some or all illustrated features may be omitted in a particular implementation within the scope of the present disclosure, and some illustrated features may not be required for implementation of all embodiments. In some examples, the process 700 may be carried out by the UE 1400 illustrated in FIG. 14. In some examples, the process 700 may be carried out by any suitable apparatus or means for carrying out the functions or algorithm described below.

At block 702, a BS may determine whether a grant will cause a UE to switch transmission modes. For example, the BS may determine whether the grant will cause the UE to switch from case 1 to case 2 of option 1 of FIG. 5, or vice versa.

At block 704, the BS may select an equation for estimating a preparation time based on whether the grant will cause the UE to switch transmission modes. For example, if the grant will cause the UE to switch transmission modes, the BS may select Equation 8 or Equation 9, or take other action to increase the preparation time to accommodate the transmission mode switch. On the other hand, if the grant will not cause the UE to switch transmission modes, the BS may select another equation (e.g., an equation without the switch_time parameter), or set to the value of the switch_time parameter to 0 for Equation 8 or Equation 9, or take other action to determine a preparation time that does not accommodate a transmission mode switch At block 706, the BS may use the equation to estimate the preparation time for a transmission on an RF carrier. For example, if the grant will cause the UE to switch transmission modes, the BS may use Equation 8 or Equation 9 to estimate the preparation time.

Figure 8:
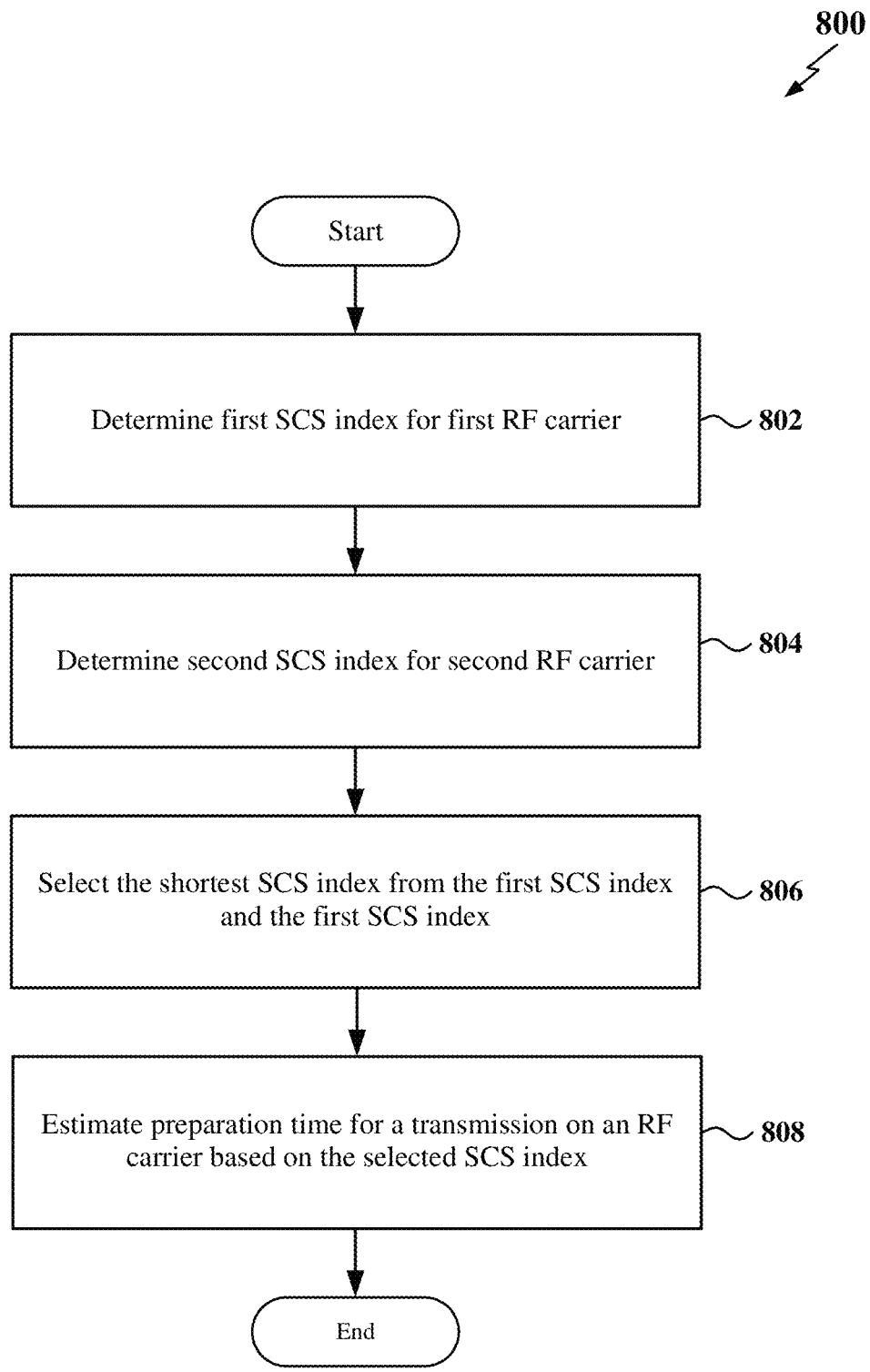
FIG. 8 is a flow chart that shows a BS determining a preparation time by selecting a smallest subcarrier spacing (SCS) for a preparation time calculation according to some aspects of the disclosure.

FIG. 8 is a flow chart that shows a BS determining a preparation time by selecting a smallest subcarrier spacing (SCS) for a preparation time calculation according to some aspects of the disclosure. As described herein, some or all illustrated features may be omitted in a particular implementation within the scope of the present disclosure, and some illustrated features may not be required for implementation of all embodiments. In some examples, the process 800 may be carried out by the BS 900 illustrated in FIG. 9. In some examples, the process 800 may be carried out by any suitable apparatus or means for carrying out the functions or algorithm described below.

At block 802, a BS may determine a first SCS index for a first RF carrier. For example, as discussed above, the BS may identify the lowest SCS index used among all BWPs of the first carrier.

At block 804, the BS may determine a second SCS index for a second RF carrier. For example, as discussed above, the BS may identify the lowest SCS index used among all BWPs of the second carrier.

At block 806, the BS may select the shortest SCS index from the first SCS index and the second SCS index. For example, if the first SCS index is 0 and the second SCS index is 1, the BS selects the first SCS index.

At block 808, the BS may estimate the preparation time for a transmission on an RF carrier based on the selected SCS index. In some implementations, the BS may incorporate the selected SCS index (the μ parameter) into Equation 2 or 3 and execute the equation to calculate $T_{proc,CSI}$ (the preparation time to use for sending a grant for a PUSCH transmission). In some implementations, the BS may incorporate the selected SCS index (the μ parameter) into Equation 6 or 7 and execute the equation to calculate $T_{proc,CSI}$ (the preparation time to use for sending a grant for a CSI transmission).

Figure 9:
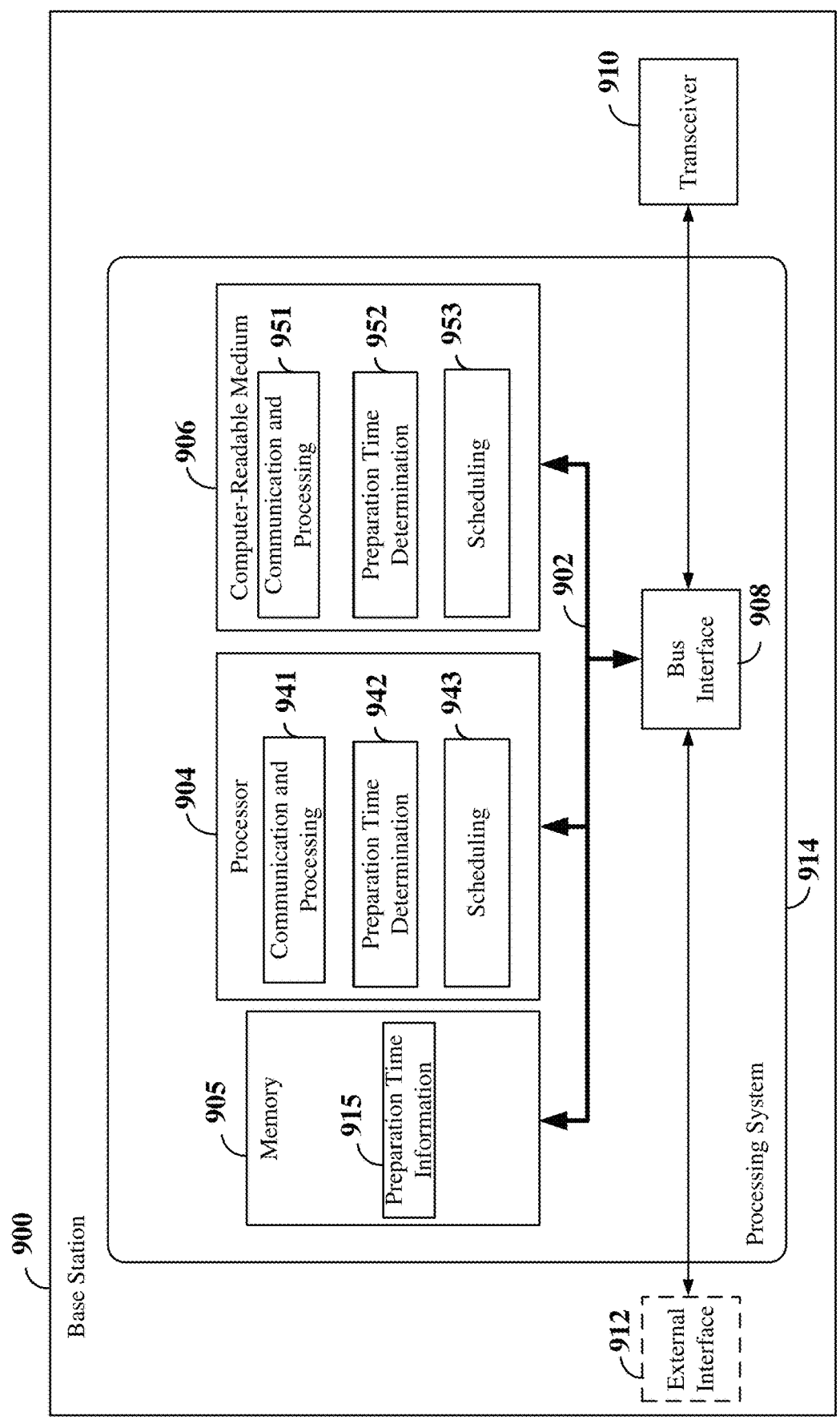
FIG. 9 is a block diagram conceptually illustrating an example of a hardware implementation for a BS employing a processing system according to some aspects of the disclosure.

FIG. 9 is a block diagram conceptually illustrating an example of a hardware implementation for a BS 900 employing a processing system 914 according to some aspects of the disclosure. In accordance with various aspects of the disclosure, an element, or any portion of an element, or any combination of elements may be implemented with a processing system 914 that includes one or more processors 904. In some implementations, the BS 900 may correspond to one or more of the scheduling entity 108 (e.g., a gNB, a transmit receive point, a UE, etc.) of FIG. 1, the base station 210, 212, 214, or 218 of FIG. 2, or the base station 404 or 408 of FIG. 4.

The BS 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the BS 900 may be configured to perform any one or more of the functions described herein. That is, the processor 904, as utilized in a BS 900, may be used to implement any one or more of the processes and procedures described below.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910 and between the bus 902 and an interface 930. The transceiver 910 provides a communication interface or means for communicating with various other apparatus over a wireless transmission medium. In some examples, the wireless communication device may include two or more transceivers 910, each configured to communicate with a respective network type (e.g., terrestrial or non-terrestrial). At least one external interface 912 (e.g., a network interface and/or a user interface) provides a communication interface or means of communicating with various other apparatus and devices (e.g., other devices housed within the same apparatus as the BS 900 or an external apparatus) over an internal bus or external transmission medium, such as an Ethernet cable.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The BS 900 may be configured to perform any one or more of the operations described herein (e.g., as described above in conjunction with FIGS. 1-8 and as described below in conjunction with FIGS. 10 and 11). In some aspects of the disclosure, the processor 904, as utilized in the BS 900, may include circuitry configured for various functions.

The processor 904 may include communication and processing circuitry 941. The communication and processing circuitry 941 may include one or more hardware components that provide the physical structure that performs various processes related to wireless communication (e.g., signal reception and/or signal transmission) as described herein. The communication and processing circuitry 941 may further include one or more hardware components that provide the physical structure that performs various processes related to signal processing (e.g., processing a received signal and/or processing a signal for transmission) as described herein. In some examples, the communication and processing circuitry 941 may include two or more transmit/receive chains. The communication and processing circuitry 941 may further be configured to execute communication and processing software 951 included on the computer-readable medium 906 to implement one or more functions described herein.

In some implementations where the communication involves receiving information, the communication and processing circuitry 941 may obtain information from a component of the BS 900 (e.g., from the transceiver 910 that receives the information via radio frequency signaling or some other type of signaling suitable for the applicable communication medium), process (e.g., decode) the information, and output the processed information. For example, the communication and processing circuitry 941 may output the information to another component of the processor 904, to the memory 905, or to the bus interface 908. In some examples, the communication and processing circuitry 941 may receive one or more of signals, messages, other information, or any combination thereof. In some examples, the communication and processing circuitry 941 may receive information via one or more channels. In some examples, the communication and processing circuitry 941 may include functionality for a means for receiving.

In some implementations where the communication involves sending (e.g., transmitting) information, the communication and processing circuitry 941 may obtain information (e.g., from another component of the processor 904, the memory 905, or the bus interface 908), process (e.g., encode) the information, and output the processed information. For example, the communication and processing circuitry 941 may output the information to the transceiver 910 (e.g., that transmits the information via radio frequency signaling or some other type of signaling suitable for the applicable communication medium). In some examples, the communication and processing circuitry 941 may send one or more of signals, messages, other information, or any combination thereof. In some examples, the communication and processing circuitry 941 may send information via one or more channels. In some examples, the communication and processing circuitry 941 may include functionality for a means for sending (e.g., means for transmitting).

The processor 904 may include preparation time determination circuitry 942 configured to perform preparation time determination-related operations as discussed herein. The preparation time determination circuitry 942 may include functionality for a means for determining a preparation time. The preparation time determination circuitry 942 may further be configured to execute preparation time determination software 952 included on the computer-readable medium 906 to implement one or more functions described herein.

The processor 904 may include scheduling circuitry 943 configured to perform scheduling-related operations as discussed herein. The scheduling circuitry 943 may include functionality for a means for transmitting a grant. The scheduling circuitry 943 may further be configured to execute scheduling software 953 included on the computer-readable medium 906 to implement one or more functions described herein.

Figure 10:
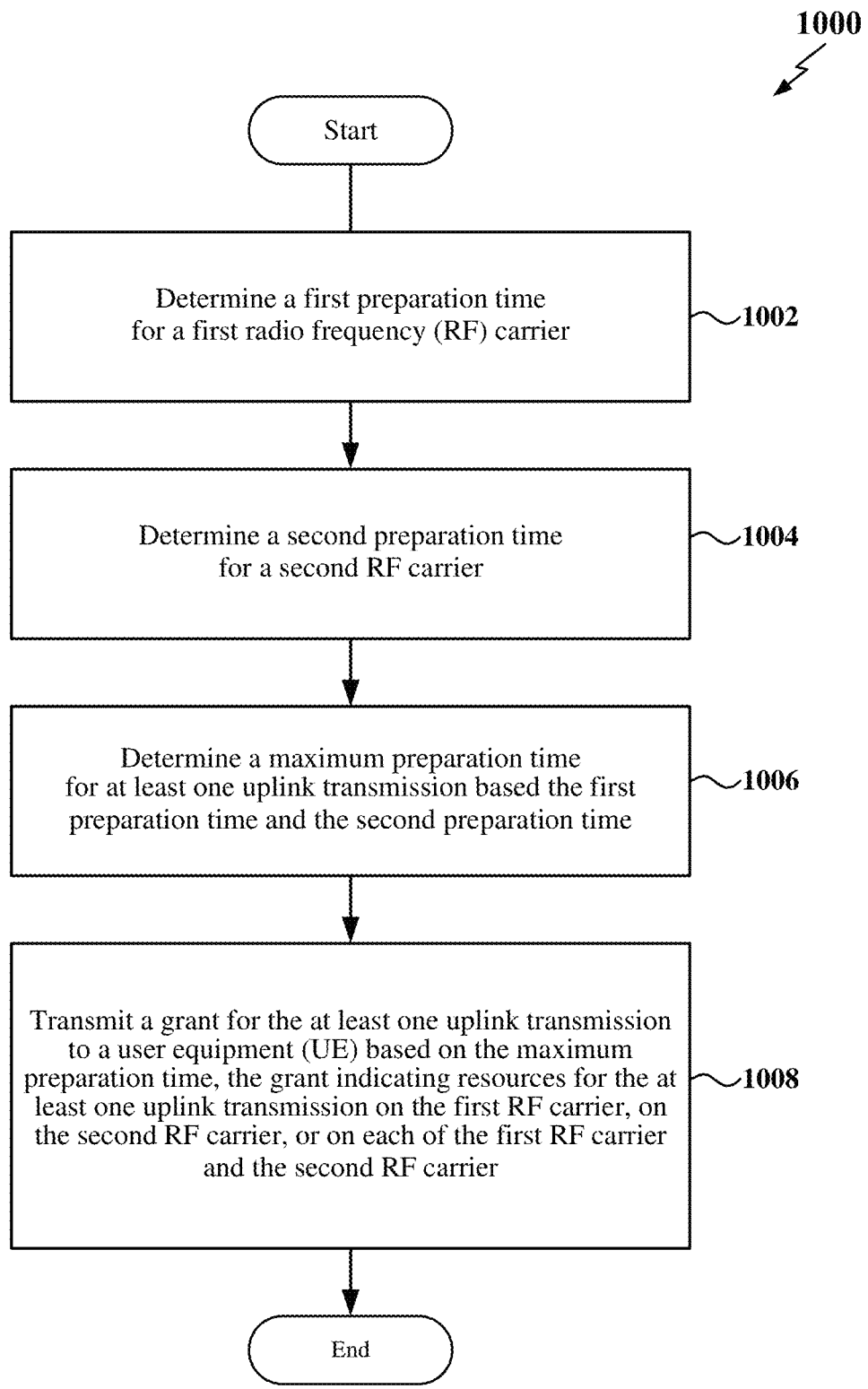
FIG. 10 is a flow chart illustrating an example wireless communication process for scheduling a UE according to some aspects of the disclosure.

FIG. 10 is a flow chart illustrating an example wireless communication process for scheduling a UE according to some aspects of the disclosure. As described herein, some or all illustrated features may be omitted in a particular implementation within the scope of the present disclosure, and some illustrated features may not be required for implementation of all embodiments. In some examples, the process 1000 may be carried out by the BS 900 illustrated in FIG. 9. In some examples, the process 1000 may be carried out by any suitable apparatus or means for carrying out the functions or algorithm described below.

At block 1002, a BS may determine a first preparation time for a first radio frequency (RF) carrier. For example, the preparation time determination circuitry 942, shown and described above in connection with FIG. 9, may determine the $T_{proc,2}$ parameter for a first component carrier. In some examples, determining the first preparation time may include estimating any one of a first duration of time required by the UE to decode the grant, a second duration of time required by the UE to generate the at least one uplink transmission, a third duration of time associated with switching between a first uplink transmission mode and a second uplink transmission mode, a fourth duration of time required by the UE for waiting for a valid transmission time in an uplink transmission pipeline, or a combination of these durations of time. In some examples, determining the first preparation time may include determining a subcarrier spacing (SCS) index for the first RF carrier. In some examples, determining the SCS index for the first RF carrier may include determining a lowest SCS of all bandwidth parts (BWPs) of the first RF carrier.

At block 1004, the BS may determine a second preparation time for a second RF carrier. For example, the preparation time determination circuitry 942, shown and described above in connection with FIG. 8, may determine the $T_{proc,2}$ parameter for a first component carrier. In some examples, determining the second preparation time may include estimating any one of a first duration of time required by the UE to decode the grant, a second duration of time required by the UE to generate the at least one uplink transmission, a third duration of time associated with switching between a first uplink transmission mode and a second uplink transmission mode, a fourth duration of time required by the UE for waiting for a valid transmission time in an uplink transmission pipeline, or a combination of these durations of time. In some examples, determining the second preparation time may include determining a subcarrier spacing (SCS) index for the second RF carrier. In this case, determining the SCS index for the second RF carrier may include determining a lowest SCS of all bandwidth parts (BWPs) of the second RF carrier.

The RF carriers may be configured in different ways in different implementations. The first RF carrier may be configured for time division duplex (TDD) multiplexing and the second RF carrier may be configured for frequency division duplex (FDD) multiplexing. In some examples, the first RF carrier has a configured downlink and the second RF carrier does not have a configured downlink. In some examples, the first RF carrier may be a Third Generation Partnership Project (3GPP) New Radio (NR) carrier and the second RF carrier may be a 3GPP Long Term Evolution (LTE) carrier.

At block 1006, the BS may determine a maximum preparation time for at least one uplink transmission based on the first preparation time and the second preparation time. For example, the preparation time determination circuitry 942, shown and described above in connection with FIG. 9, may identify the shortest $T_{proc,2}$ parameter from a first $T_{proc,2}$ parameter for a first component carrier and a second $T_{proc,2}$ parameter for a second component carrier (e.g., $T_{proc,2}$=max $(T_{proc,2,CC1}, T_{proc,2,CC2})$). In some examples, determining the maximum preparation time for the at least one uplink transmission based on the first preparation time and the second preparation time may include selecting the longest of the first preparation time or the second preparation time.

At block 1008, the BS may transmit a grant for the at least one uplink transmission to a user equipment (UE) based on the maximum preparation time, the grant indicating resources for the at least one uplink transmission on the first RF carrier, on the second RF carrier, or on each of the first RF carrier and the second RF carrier. For example, the scheduling circuitry 943 in cooperation with the communication and processing circuitry 941 and the transceiver 910, shown and described above in connection with FIG. 9, may transmit the grant to the UE a sufficient amount of time (based on the preparation time) before the UE is to transmit the at least one transmission. In some examples, the resources for the at least one uplink transmission may commence at a first time. In this case, transmitting the grant for the at least one uplink transmission to the UE based on the maximum preparation time may include transmitting the grant to the UE at a second time that precedes the first time by at least the maximum preparation time.

In some examples, the grant may be configured to trigger a switch by the UE between operating in a first uplink transmission mode and operating in a second uplink transmission mode. In some examples, for operation by the UE in the first uplink transmission mode, the grant may indicate resources for the at least one uplink transmission on the first RF carrier and not on the second RF carrier. For operation by the UE in the second uplink transmission mode, the grant may indicate resources for the at least one uplink transmission on each of the first RF carrier and the second RF carrier. In some examples, for operation by the UE in the first uplink transmission mode, the grant may indicate resources for the at least one uplink transmission on the first RF carrier and not on the second RF carrier and where, for operation by the UE in the second uplink transmission mode, the grant may indicate resources for the at least one uplink transmission on the second RF carrier and not on the first RF carrier. The switch by the UE between operating in the first uplink transmission mode and operating in the second uplink transmission mode may include a switch from operating in the first uplink transmission mode to operating in the second uplink transmission mode. Alternatively, the switch by the UE between operating in the first uplink transmission mode and operating in the second uplink transmission mode may include a switch from operating in the second uplink transmission mode to operating in the first uplink transmission mode.

In some examples, the process may further include determining a third preparation time for a physical uplink shared channel (PUSCH), determining that the third preparation time is less than the maximum preparation time and, responsive to determining that the third preparation time is less than the maximum preparation time, generating the grant to not trigger a switch at the UE between a first uplink transmission mode and a second uplink transmission mode. In some examples, for operation by the UE in the first uplink transmission mode, the grant may indicate resources for the at least one uplink transmission on the first RF carrier and not on the second RF carrier. In this case, for operation by the UE in the second uplink transmission mode, the grant may indicate resources for the at least one uplink transmission on each of the first RF carrier and the second RF carrier. Alternatively, for operation by the UE in the first uplink transmission mode, the grant may indicate resources for the at least one uplink transmission on the first RF carrier and not on the second RF carrier. In this case, for operation by the UE in the second uplink transmission mode, the grant may indicate resources for the at least one uplink transmission on the second RF carrier and not on the first RF carrier.

Figure 11:
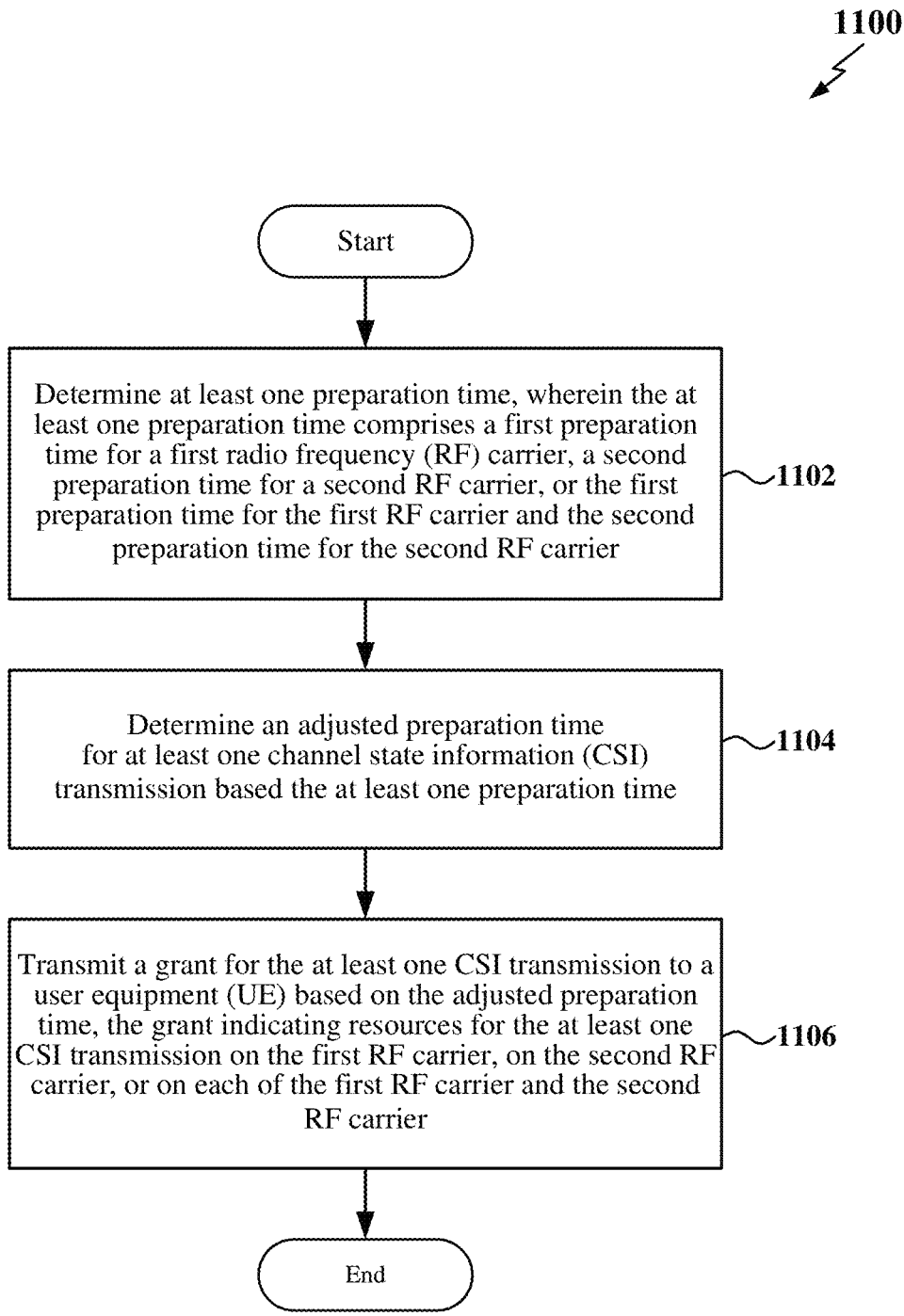
FIG. 11 is a flow chart illustrating another example wireless communication process for scheduling a UE according to some aspects of the disclosure.

FIG. 11 is a flow chart illustrating another example wireless communication process for scheduling a UE according to some aspects of the disclosure. As described herein, some or all illustrated features may be omitted in a particular implementation within the scope of the present disclosure, and some illustrated features may not be required for implementation of all embodiments. In some examples, the process 1100 may be carried out by the BS 900 illustrated in FIG. 9. In some examples, the process 1100 may be carried out by any suitable apparatus or means for carrying out the functions or algorithm described below.

At block 1102, a BS may determine at least one preparation time, wherein the at least one preparation time may include a first preparation time for a first radio frequency (RF) carrier, a second preparation time for a second RF carrier, or the first preparation time for the first RF carrier and the second preparation time for the second RF carrier. For example, the preparation time determination circuitry 942, shown and described above in connection with FIG. 9, may determine a $T_{proc,2}$ parameter for a first component carrier, or for a second component carrier, or for each of a first component carrier and a second component carrier. The determination of at least one preparation time at block 1102 may involve determining at least one preparation time for a single RF carrier (e.g., the first RF carrier or the second RF carrier). In some examples, the determination of at least one preparation time at block 1102 may include determining a first preparation time for the first RF carrier and determining a second preparation time for the second RF carrier. In some examples, determining the at least one preparation time may include determining a subcarrier spacing (SCS) index for the first RF carrier and/or determining an SCS index for the second RF carrier.

The RF carriers may be configured in different ways in different implementations. For example, the first RF carrier may be configured for time division duplex (TDD) multiplexing and the second RF carrier may be configured for frequency division duplex (FDD) multiplexing. In another example, the first RF carrier will have a configured downlink and the second RF carrier will not have a configured downlink. In some examples, the first RF carrier may be a Third Generation Partnership Project (3GPP) New Radio (NR) carrier and the second RF carrier may be a 3GPP Long Term Evolution (LTE) carrier.

At block 1104, the BS may determine an adjusted preparation time for at least one channel state information (CSI) transmission based on the at least one preparation time. In some examples, determining the adjusted preparation time may include increasing an uplink preparation time by a defined value. For example, the preparation time determination circuitry 942, shown and described above in connection with FIG. 9, may use a defined value (e.g., switch_time) in the calculation of the preparation time. The use of this defined value may result in an increase of the preparation time (e.g., by a factor based on the defined value).

In some examples, the determination of the adjusted preparation time may include determining a maximum preparation time based on the first preparation time and the second preparation time. In some examples, determining the maximum preparation time based the first preparation time and the second preparation time may include selecting the longest of the first preparation time or the second preparation time. In some examples, the preparation time determination circuitry 942, shown and described above in connection with FIG. 9, may identify the shortest $T_{proc,CSI}$ parameter from a first $T_{proc,CSI}$ parameter for a first component carrier and a second $T_{proc,CSI}$ parameter for a second component carrier (e.g., $T_{proc,CSI}$=max ($T_{proc,CSI,CC1}$, $T_{proc,CSI,CC2}$)).

At block 1106, the BS may transmit a grant for the at least one CSI transmission to a user equipment (UE) based on the adjusted preparation time, the grant indicating resources for the at least one CSI transmission on the first RF carrier, on the second RF carrier, or on each of the first RF carrier and the second RF carrier. For example, the scheduling circuitry 943 in cooperation with the communication and processing circuitry 941 and the transceiver 910, shown and described above in connection with FIG. 8, may transmit the grant to the UE a sufficient amount of time (based on the adjusted preparation time) before the UE is to transmit the at least one transmission. In some examples, the indicating of resources at block 1106 may involve indicating resources for the at least one CSI transmission on a single RF carrier (e.g., the first RF carrier or the second RF carrier). Alternatively, the indicating of resources at block 1106 may involve indicating resources for the at least one CSI transmission on the first RF carrier and on the second RF carrier.

In some examples, the resources for the at least one CSI transmission may commence at a first time. In this case, transmitting the grant for the at least one CSI transmission to the UE based on the adjusted preparation time may include transmitting the grant to the UE at a second time that precedes the first time by at least the maximum preparation time.

The grant may be configured to trigger a switch by the UE between operating in a first uplink transmission mode and operating in a second uplink transmission mode. Here, determining the adjusted preparation time may include increasing an uplink preparation time by a defined value, where the defined value is greater than zero if the switch by the UE between operating in the first uplink transmission mode and operating in the second uplink transmission mode takes place at the first time. Alternatively, determining the adjusted preparation time may include increasing an uplink preparation time by a defined value, where the defined value is zero if the switch by the UE between operating in the first uplink transmission mode and operating in the second uplink transmission mode does not take place at the first time.

In some examples, the process may further include determining a third preparation time for a physical uplink shared channel (PUSCH), determining that the third preparation time is less than the maximum preparation time and, responsive to determining that the third preparation time is less than the maximum preparation time, generating the grant to not trigger a switch at the UE between a first uplink transmission mode and a second uplink transmission mode. In some examples, for operation by the UE in the first uplink transmission mode, the grant may indicate resources for the at least one uplink transmission on the first RF carrier and not on the second RF carrier. In this case, for operation by the UE in the second uplink transmission mode, the grant may indicate resources for the at least one uplink transmission on each of the first RF carrier and the second RF carrier. Alternatively, for operation by the UE in the first uplink transmission mode, the grant may indicate resources for the at least one uplink transmission on the first RF carrier and not on the second RF carrier. In this case, for operation by the UE in the second uplink transmission mode, the grant may indicate resources for the at least one uplink transmission on the second RF carrier and not on the first RF carrier.

Figure 12:
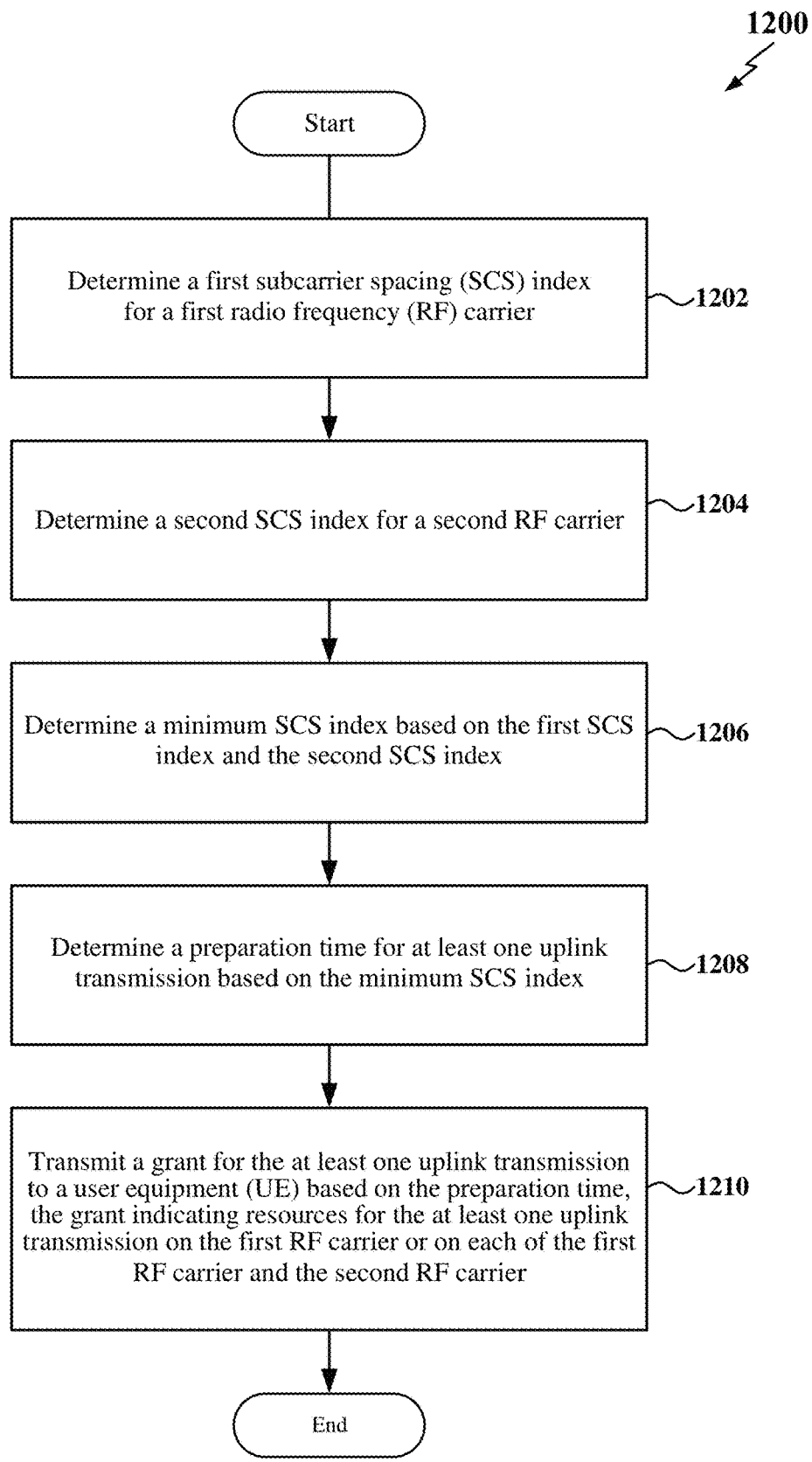
FIG. 12 is a flow chart illustrating another example wireless communication process for scheduling a UE according to some aspects of the disclosure.

FIG. 12 is a flow chart illustrating another example wireless communication process 1200 for scheduling a UE according to some aspects of the disclosure. As described below, some or all illustrated features may be omitted in a particular implementation within the scope of the present disclosure, and some illustrated features may not be required for implementation of all embodiments. In some examples, the process 1200 may be carried out by the BS 900 illustrated in FIG. 9. In some examples, the process 1200 may be carried out by any suitable apparatus or means for carrying out the functions or algorithm described below.

At block 1202, a BS may determine a first subcarrier spacing (SCS) index for a first radio frequency (RF) carrier. For example, the preparation time determination circuitry 942, shown and described above in connection with FIG. 9, may determine the p parameter for a first component carrier. In some examples, determining the first SCS index for the first RF carrier may include determining a lowest SCS of all bandwidth parts (BWPs) of the first RF carrier.

At block 1204, the BS may determine a second SCS index for a second RF carrier. For example, the preparation time determination circuitry 942, shown and described above in connection with FIG. 9, may determine the µ parameter for a second component carrier. In some examples, determining the second SCS index for the first RF carrier may include determining a lowest SCS of all bandwidth parts (BWPs) of the second RF carrier.

The RF carriers may be configured in different ways in different implementations. For example, the first RF carrier may be configured for time division duplex (TDD) multiplexing and the second RF carrier may be configured for frequency division duplex (FDD) multiplexing. In some examples, the first RF carrier may be a first component carrier of a plurality of component carriers for the UE and the second RF carrier may be a second component carrier of the plurality of component carriers. In some examples, the first RF carrier may be a first millimeter wave (mmW) band carrier or a first sub-6-GHz band carrier and the second RF carrier may be a second millimeter wave (mmW) band carrier or a second sub-6-GHz band carrier. In some examples, the first RF carrier may be a Frequency Range 1 (FR1) carrier and the second RF carrier may be a Frequency Range 2 (FR2) carrier. Alternatively, the first RF carrier may be a Frequency Range 2 (FR2) carrier and the second RF carrier may be a Frequency Range 1 (FR1) carrier.

At block 1206, the BS may determine a minimum SCS index based on the first SCS index and the second SCS index. For example, the preparation time determination circuitry 942, shown and described above in connection with FIG. 9, may identify the shortest µ parameter from a first µ parameter for a first component carrier and a second p parameter for a second component carrier (e.g., $\mu_{min}$=min ($\mu_1, \mu_2$)). In some examples, determining the minimum SCS index based on the first SCS index and the second SCS index may include selecting the lowest of the first SCS index or the second SCS index.

At block 1208, the BS may determine a preparation time for at least one uplink transmission based on the minimum SCS index. For example, the preparation time determination circuitry 942, shown and described above in connection with FIG. 9, may use Equation 1 to calculate $T_{proc,2}$. In some examples, determining the preparation time may include estimating any one of a first duration of time required by the UE to decode the grant, a second duration of time required by the UE to generate the at least one uplink transmission, a third duration of time associated with switching between a first uplink transmission mode and a second uplink transmission mode, a fourth duration of time required by the UE for waiting for a valid transmission time in an uplink transmission pipeline, or a combination of these durations of time.

At block 1210, the BS may transmit a grant for the at least one uplink transmission to a user equipment (UE) based on the preparation time, the grant indicating resources for the at least one uplink transmission on the first RF carrier or on each of the first RF carrier and the second RF carrier. For example, the scheduling circuitry 943 in cooperation with the communication and processing circuitry 941 and the transceiver 910, shown and described above in connection with FIG. 9, may transmit the grant to the UE a sufficient amount of time (based on the preparation time) before the UE is to transmit the at least one transmission. In some examples, the resources for the at least one uplink transmission may commence at a first time. In this case, transmitting the grant for the at least one uplink transmission to the UE based on the preparation time may include transmitting the grant to the UE at a second time that precedes the first time by at least the preparation time.

In some examples, the grant may be configured to trigger a switch by the UE between operating in a first uplink transmission mode and operating in a second uplink transmission mode. For operation by the UE in the first uplink transmission mode, the grant may indicate resources for the at least one uplink transmission on the first RF carrier and not on the second RF carrier. In addition, for operation by the UE in the second uplink transmission mode, the grant may indicate resources for the at least one uplink transmission on each of the first RF carrier and the second RF carrier. In some examples, the switch by the UE between operating in the first uplink transmission mode and operating in the second uplink transmission mode may be a switch from operating in the first uplink transmission mode to operating in the second uplink transmission mode. Alternatively, the switch by the UE between operating in the first uplink transmission mode and operating in the second uplink transmission mode may be a switch from operating in the second uplink transmission mode to operating in the first uplink transmission mode.

In some examples, the UE may include a plurality of RF chains where, for operation by the UE in the first uplink transmission mode, the grant may be configured to trigger the UE to use at least two of the plurality of RF chains for the at least one uplink transmission on the first RF carrier. In some examples, the UE may include a plurality of RF chains, where, for operation by the UE in the second uplink transmission mode, the grant may be configured to trigger the UE to use, for the at least one uplink transmission on each of the first RF carrier and the second RF carrier, at least a first RF chain of the plurality of RF chains to transmit on the first RF carrier and at least a second RF chain of the plurality of RF chains to transmit on the second RF carrier.

Figure 13:
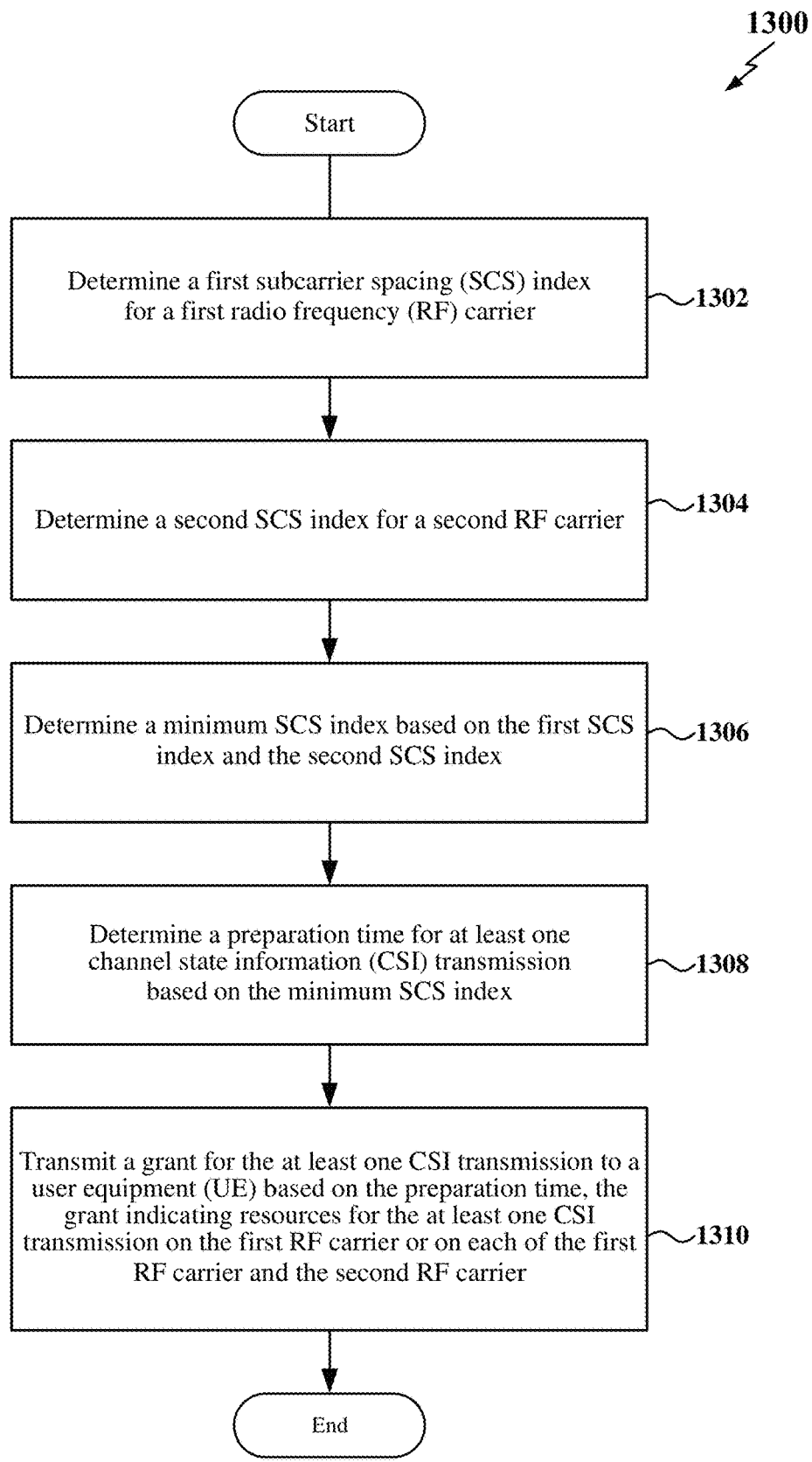
FIG. 13 is a flow chart illustrating another example wireless communication process for scheduling a UE according to some aspects of the disclosure.

FIG. 13 is a flow chart illustrating another example wireless communication process 1300 for scheduling a UE according to some aspects of the disclosure. As described below, some or all illustrated features may be omitted in a particular implementation within the scope of the present disclosure, and some illustrated features may not be required for implementation of all embodiments. In some examples, the process 1300 may be carried out by the BS 900 illustrated in FIG. 9. In some examples, the process 1300 may be carried out by any suitable apparatus or means for carrying out the functions or algorithm described below.

At block 1302, a BS may determine a first subcarrier spacing (SCS) index for a first radio frequency (RF) carrier.

For example, the preparation time determination circuitry 942, shown and described above in connection with FIG. 9, may determine the p parameter for a first component carrier. In some examples, determining the first SCS index for the first RF carrier may include determining a lowest SCS of all bandwidth parts (BWPs) of the first RF carrier.

At block 1304, the BS may determine a second SCS index for a second RF carrier. For example, the preparation time determination circuitry 942, shown and described above in connection with FIG. 9, may determine the μ parameter for a second component carrier. the second SCS index for the first RF carrier may include determining a lowest SCS of all bandwidth parts (BWPs) of the second RF carrier.

The RF carriers may be configured in different ways in different implementations. For example, the first RF carrier may be configured for time division duplex (TDD) multiplexing and the second RF carrier may be configured for frequency division duplex (FDD) multiplexing, the first RF carrier may be a first component carrier of a plurality of component carriers for the UE and the second RF carrier may be a second component carrier of the plurality of component carriers. The first RF carrier may be a first millimeter wave (mmW) band carrier or a first sub-6-GHz band carrier and the second RF carrier may be a second millimeter wave (mmW) band carrier or a second sub-6-GHz band carrier. The first RF carrier may be a Frequency Range 1 (FR1) carrier and the second RF carrier may be a Frequency Range 2 (FR2) carrier. Alternatively, the first RF carrier may be a Frequency Range 2 (FR2) carrier and the second RF carrier may be a Frequency Range 1 (FR1) carrier.

At block 1306, the BS may determine a minimum SCS index based on the first SCS index and the second SCS index. For example, the preparation time determination circuitry 942, shown and described above in connection with FIG. 9, may identify the shortest μ parameter from a first μ parameter for a first component carrier and a second p parameter for a second component carrier (e.g., μmin=min ($\mu_1$, $\mu_2$)). Determining the minimum SCS index based on the first SCS index and the second SCS index may include selecting the lowest of the first SCS index or the second SCS index.

At block 1308, the BS may determine a preparation time for at least one channel state information (CSI) transmission based on the minimum SCS index. For example, the preparation time determination circuitry 942, shown and described above in connection with FIG. 9, may execute Equation 5 to calculate $T_{proc,CSI}$. In some examples, determining the preparation time may include estimating any one of a first duration of time required by the UE to decode the grant, a second duration of time required by the UE to generate the at least one CSI transmission, a third duration of time associated with switching between a first CSI transmission mode and a second CSI transmission mode, a fourth duration of time required by the UE for waiting for a valid transmission time in an CSI transmission pipeline, or a combination of these durations of time.

At block 1310, the BS may transmit a grant for the at least one CSI transmission to a user equipment (UE) based on the preparation time, the grant indicating resources for the at least one CSI transmission on the first RF carrier or on each of the first RF carrier and the second RF carrier. For example, the scheduling circuitry 943 in cooperation with the communication and processing circuitry 941 and the transceiver 910, shown and described above in connection with FIG. 9, may transmit the grant to the UE a sufficient amount of time (based on the preparation time) before the UE is to transmit the at least one transmission. Transmitting the grant may include transmitting the grant on the first RF carrier. The grant may schedule the at least one CSI transmission on the second RF carrier.

In some examples, resources for the at least one CSI transmission may commence at a first time. In this case, transmitting the grant for the at least one CSI transmission to the UE based on the preparation time may include transmitting the grant to the UE at a second time that precedes the first time by at least the preparation time.

In some examples, a grant may be configured to trigger a switch by the UE between operating in a first CSI transmission mode and operating in a second CSI transmission mode. For operation by the UE in the first CSI transmission mode, the grant may indicate resources for the at least one CSI transmission on the first RF carrier and not on the second RF carrier. For operation by the UE in the second CSI transmission mode, the grant may indicate resources for the at least one CSI transmission on each of the first RF carrier and the second RF carrier. The switch by the UE between operating in the first CSI transmission mode and operating in the second CSI transmission mode may be a switch from operating in the first CSI transmission mode to operating in the second CSI transmission mode. Alternatively, the switch by the UE between operating in the first CSI transmission mode and operating in the second CSI transmission mode may be a switch from operating in the second CSI transmission mode to operating in the first CSI transmission mode.

In some examples, the UE may include a plurality of RF chains, where, for operation by the UE in the first CSI transmission mode, the grant may be configured to trigger the UE to use at least two of the plurality of RF chains for the at least one CSI transmission on the first RF carrier. In some examples, the UE may include a plurality of RF chains, where, for operation by the UE in the second CSI transmission mode, the grant may be configured to trigger the UE to use, for the at least one CSI transmission on each of the first RF carrier and the second RF carrier, at least a first RF chain of the plurality of RF chains to transmit on the first RF carrier and at least a second RF chain of the plurality of RF chains to transmit on the second RF carrier.

Figure 14:
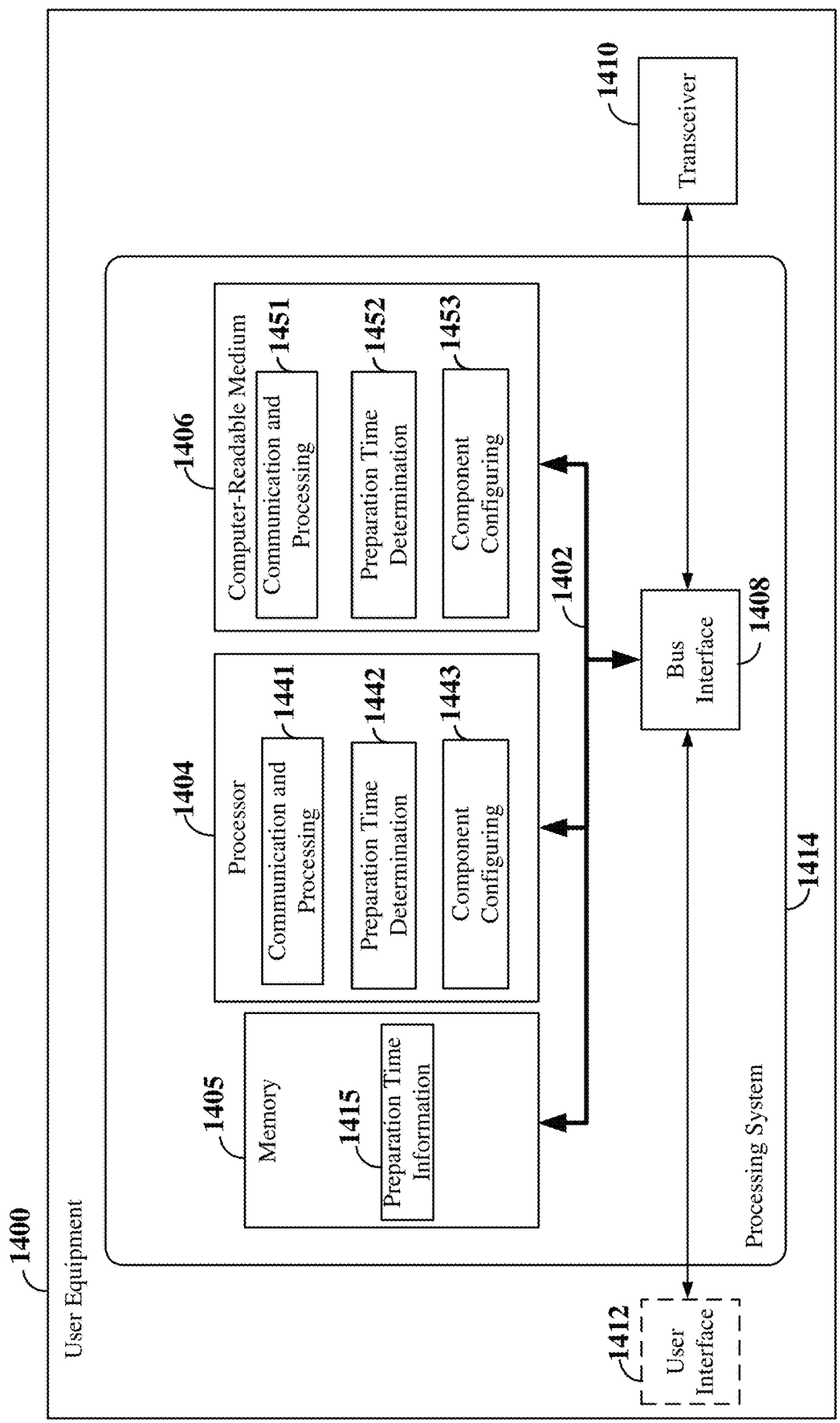
FIG. 14 is a block diagram conceptually illustrating an example of a hardware implementation for a UE employing a processing system according to some aspects of the disclosure.

FIG. 14 is a block diagram conceptually illustrating an example of a hardware implementation for a UE 1400 employing a processing system 1414 according to some aspects of the disclosure. The UE 1400 may be configured to wirelessly communicate with a base station, as discussed in any one or more of FIGS. 1-8. In accordance with various aspects of the disclosure, an element, or any portion of an element, or any combination of elements may be implemented with the processing system 1414 that includes one or more processors 1404. In some implementations, the UE 1400 may correspond to one or more of the scheduled entity 106 (e.g., a UE, etc.) of FIG. 1, the UE 222, 224, 226, 228, 230, 232, 234, 238, 240, or 242 of FIG. 2, or the UE 410 of FIG. 4.

The processing system 1414 may be substantially the same as the processing system 814 illustrated in FIG. 8, including a bus interface 1408, a bus 1402, memory 1405, a processor 1404, and a computer-readable medium 1406, a user interface 1412 (such as a keypad, a display, a speaker, a microphone, a joystick, etc.), and a transceiver 1410. Of course, such a user interface 1412 is optional, and may be omitted in some examples, such as an IoT device.

The UE 1400 may be configured to perform any one or more of the operations described herein (e.g., as described above in conjunction with FIGS. 1-8 and as described below in conjunction with FIG. 15). In some aspects of the disclosure, the processor 1404, as utilized in the UE 1400, may include circuitry configured for various functions.

In some aspects of the disclosure, the processor 1404 may include communication and processing circuitry 1441. The communication and processing circuitry 1441 may include one or more hardware components that provide the physical structure that performs various processes related to communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. The communication and processing circuitry 1441 may further be configured to execute communication and processing software 1451 included on the computer-readable medium 1406 to implement one or more functions described herein.

In some implementations where the communication involves receiving information, the communication and processing circuitry 1441 may obtain information from a component of the UE 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for receiving.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., means for transmitting).

The processor 1404 may include preparation time determination circuitry 1442 configured to perform preparation time determination-related operations as discussed herein. The preparation time determination circuitry 1442 may include functionality for a means for determining a preparation time. The preparation time determination circuitry 1442 may further be configured to execute preparation time determination software 1452 included on the computer-readable medium 1406 to implement one or more functions described herein.

The processor 1404 may include component configuring circuitry 1443 configured to perform component configuring-related operations as discussed herein. The component configuring circuitry 1443 may include functionality for a means for configuring a component of a UE. The component configuring circuitry 1443 may further be configured to execute component configuring software 1453 included on the computer-readable medium 1406 to implement one or more functions described herein.

Figure 15:
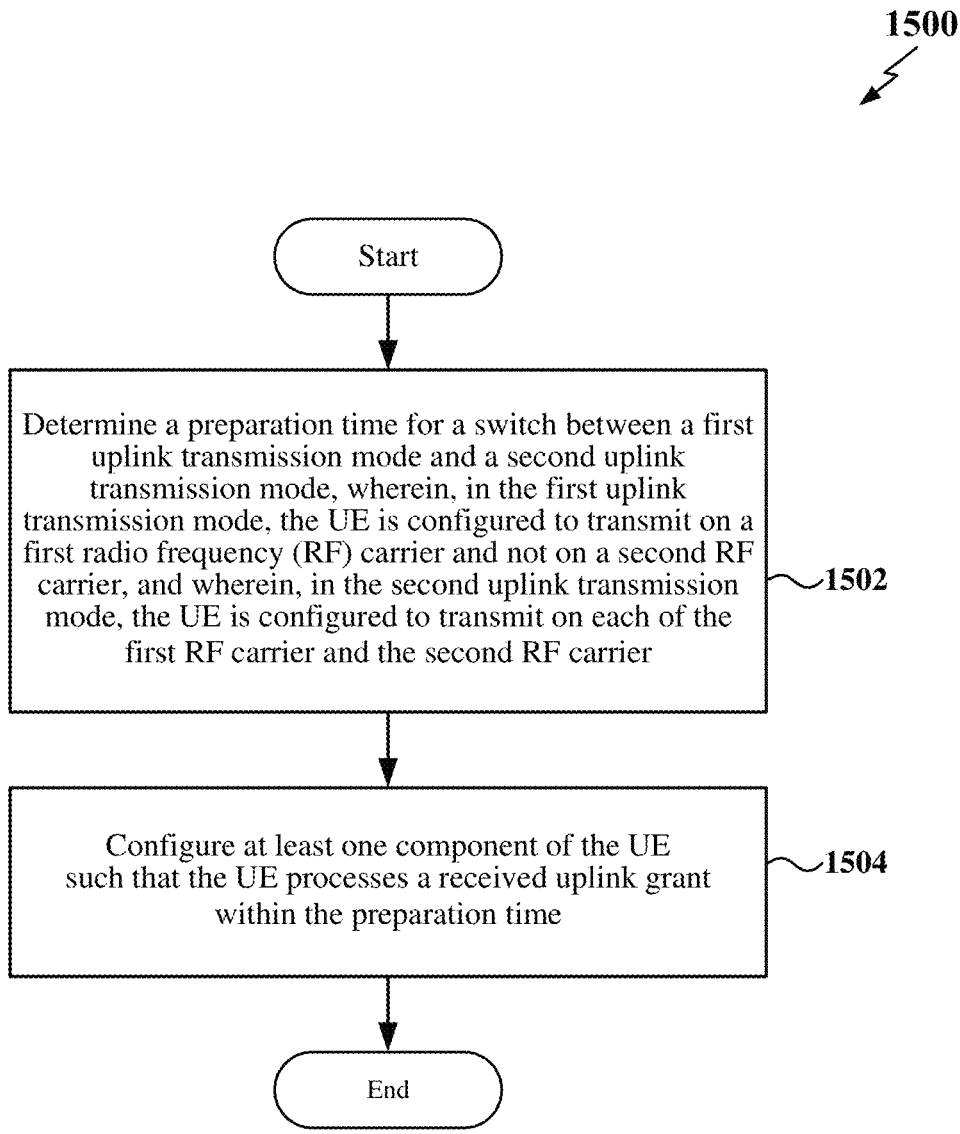
FIG. 15 is a flow chart illustrating another example wireless communication process for configuring a UE according to some aspects of the disclosure.

FIG. 15 is a flow chart illustrating an example wireless communication process for configuring a UE according to some aspects of the disclosure. As described herein, some or all illustrated features may be omitted in a particular implementation within the scope of the present disclosure, and some illustrated features may not be required for implementation of all embodiments. In some examples, the process 1500 may be carried out by the UE 1400 illustrated in FIG. 14. In some examples, the process 1500 may be carried out by any suitable apparatus or means for carrying out the functions or algorithm described below.

At block 1502, a UE may determine a preparation time for a switch between a first uplink transmission mode and a second uplink transmission mode. In the first uplink transmission mode, the UE is configured to transmit on a first radio frequency (RF) carrier and not on a second RF carrier. In the second uplink transmission mode, the UE is configured to transmit on each of the first RF carrier and the second RF carrier. For example, the preparation time determination circuitry 1442, shown and described above in connection with FIG. 14, may determine a $T_{proc,2}$ parameter or a $T_{proc,CSI}$ parameter for a first component carrier, or for a second component carrier, or for each of a first component carrier and a second component carrier. In some examples, determining the preparation time may include determining a first preparation time for the first RF carrier, determining a second preparation time for a second RF carrier, and determining a largest preparation time of the first preparation time and the second preparation time. In some examples, the first preparation time may be a preparation time for a physical uplink shared channel (PUSCH) transmission by the UE or a preparation time for a channel state information (CSI) transmission by the UE. In addition, the second preparation time is a preparation time for a PUSCH transmission by the UE or a preparation time for a CSI transmission by the UE.

In some examples, the switch between the first uplink transmission mode and the second uplink transmission mode may include a switch from the first uplink transmission mode to the second uplink transmission mode. Alternatively, the switch between the first uplink transmission mode and the second uplink transmission mode may include a switch from the second uplink transmission mode to the first uplink transmission mode.

The RF carriers may be configured in different ways in different implementations. For example, the first RF carrier may be configured for time division duplex (TDD) multiplexing and the second RF carrier may be configured for frequency division duplex (FDD) multiplexing. In some examples, the first RF carrier has a configured downlink, while the second RF carrier does not have a configured downlink. In some examples, the first RF carrier may be a Third Generation Partnership Project (3GPP) New Radio (NR) carrier and the second RF carrier is a 3GPP Long Term Evolution (LTE) carrier.

At block 1504, the UE may configure at least one component of the UE such that the UE processes a received uplink grant within the preparation time. For example, the component configuring circuitry 1443, shown and described above in connection with FIG. 1, may configure a clock circuit and/or a memory circuit. Configuring the at least one component may include setting a processing clock speed. Alternatively, or in addition, configuring the at least one component may include setting a memory allocation.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 9, and 14 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A base station, comprising:
  a transceiver; and
  a processing system configured to:
    determine a first preparation time for a first radio frequency (RF) carrier;
    determine a second preparation time for a second RF carrier;
    determine a maximum preparation time for at least one uplink transmission based on the first preparation time and the second preparation time; and
    transmit, via the transceiver, a grant for the at least one uplink transmission to a user equipment (UE) based on the maximum preparation time, the grant indicating resources for the at least one uplink transmission on the first RF carrier, on the second RF carrier, or on each of the first RF carrier and the second RF carrier.

2. The base station of claim 1, wherein the processing system is configured to:
  select a longest of the first preparation time or the second preparation time.

3. The base station of claim 1, wherein:
  the resources for the at least one uplink transmission commence at a first time; and
  to transmit, via the transceiver, the grant, the processing system is configured to transmit, via the transceiver, the grant to the UE at a second time that precedes the first time by at least the maximum preparation time.

4. The base station of claim 1, wherein the grant is configured to trigger a switch by the UE between operating in a first uplink transmission mode and operating in a second uplink transmission mode.

5. The base station of claim 4, wherein:
  for operation by the UE in the first uplink transmission mode, the grant indicates resources for the at least one uplink transmission on the first RF carrier and not on the second RF carrier; and
  for operation by the UE in the second uplink transmission mode, the grant indicates resources for the at least one uplink transmission on each of the first RF carrier and the second RF carrier.

6. The base station of claim 5, wherein the switch by the UE between operating in the first uplink transmission mode and operating in the second uplink transmission mode comprises a switch from operating in the first uplink transmission mode to operating in the second uplink transmission mode.

7. The base station of claim 5, wherein the switch by the UE between operating in the first uplink transmission mode and operating in the second uplink transmission mode comprises a switch from operating in the second uplink transmission mode to operating in the first uplink transmission mode.

8. The base station of claim 5, wherein:
  for operation by the UE in the first uplink transmission mode, the grant indicates resources for the at least one uplink transmission on the first RF carrier and not on the second RF carrier; and
  for operation by the UE in the second uplink transmission mode, the grant indicates resources for the at least one uplink transmission on the second RF carrier and not on the first RF carrier.

9. The base station of claim 1, wherein the processing system is configured to:
  estimate at least one of: a first duration of time required by the UE to decode the grant, a second duration of time required by the UE to generate the at least one uplink transmission, a third duration of time associated with switching between a first uplink transmission mode and a second uplink transmission mode, a fourth duration of time required by the UE for waiting for a valid transmission time in an uplink transmission pipeline, or any combination thereof.

10. The base station of claim 1, wherein the processing system is configured to:
  determine a subcarrier spacing (SCS) index for the first RF carrier.

11. The base station of claim 10, wherein the processing system is configured to:
  determine a lowest SCS of all bandwidth parts (BWPs) of the first RF carrier.

12. The base station of claim 1, wherein the processing system is configured to:
  determine a third preparation time for a physical uplink shared channel (PUSCH);
  determine that the third preparation time is less than the maximum preparation time; and
  responsive to determining that the third preparation time is less than the maximum preparation time, generate the grant to not trigger a switch at the UE between a first uplink transmission mode and a second uplink transmission mode.

13. The base station of claim 12, wherein:
  for operation by the UE in the first uplink transmission mode, the grant indicates resources for the at least one uplink transmission on the first RF carrier and not on the second RF carrier; and for operation by the UE in the second uplink transmission mode, the grant indicates resources for the at least one uplink transmission on each of the first RF carrier and the second RF carrier.

14. The base station of claim 12, wherein:

for operation by the UE in the first uplink transmission mode, the grant indicates resources for the at least one uplink transmission on the first RF carrier and not on the second RF carrier; and for operation by the UE in the second uplink transmission mode, the grant indicates resources for the at least one uplink transmission on the second RF carrier and not on the first RF carrier.

15. The base station of claim 1, wherein:
the first RF carrier is configured for time division duplex (TDD) multiplexing; and
the second RF carrier is configured for frequency division duplex (FDD) multiplexing.

16. The base station of claim 1, wherein:
the first RF carrier has a configured downlink; and
the second RF carrier does not have a configured downlink.

17. The base station of claim 1, wherein:
the first RF carrier is a Third Generation Partnership Project (3GPP) New Radio (NR) carrier; and
the second RF carrier is a 3GPP Long Term Evolution (LTE) carrier.

18. A user equipment (UE), comprising:
a transceiver; and
a processing system configured to:
determine a preparation time for a switch between a first uplink transmission mode and a second uplink transmission mode, wherein, in the first uplink transmission mode, the UE is configured to transmit on a first radio frequency (RF) carrier and not on a second RF carrier, and wherein, in the second uplink transmission mode, the UE is configured to transmit on each of the first RF carrier and the second RF carrier; and
configure at least one component of the UE to ensure that the UE processes a received uplink grant within the preparation time.

19. The UE of claim 18, wherein the processing system is configured to set a processing clock speed.

20. The UE of claim 18, wherein the processing system is configured to set a memory allocation.

21. The UE of claim 18, wherein the switch between the first uplink transmission mode and the second uplink transmission mode comprises a switch from the first uplink transmission mode to the second uplink transmission mode.

22. The UE of claim 18, wherein the switch between the first uplink transmission mode and the second uplink transmission mode comprises a switch from the second uplink transmission mode to the first uplink transmission mode.

23. The UE of claim 18, wherein the processing system is configured to:
determine a first preparation time for the first RF carrier;
determine a second preparation time for the second RF carrier; and
determine a largest preparation time of the first preparation time and the second preparation time.

24. The UE of claim 23, wherein:
the first preparation time is a preparation time for a physical uplink shared channel (PUSCH) transmission by the UE or a preparation time for a channel state information (CSI) transmission by the UE; and
the second preparation time is a preparation time for a PUSCH transmission by the UE or a preparation time for a CSI transmission by the UE.

25. The UE of claim 18, wherein:
the first RF carrier is configured for time division duplex (TDD) multiplexing; and
the second RF carrier is configured for frequency division duplex (FDD) multiplexing.

26. The UE of claim 18, wherein:
the first RF carrier has a configured downlink; and
the second RF carrier does not have a configured downlink.

27. The UE of claim 18, wherein:
the first RF carrier is a Third Generation Partnership Project (3GPP) New Radio (NR) carrier; and
the second RF carrier is a 3GPP Long Term Evolution (LTE) carrier.

* * * * *